United States Patent
Maru

(10) Patent No.: US 7,830,988 B2
(45) Date of Patent: Nov. 9, 2010

(54) MIMO DECODER AND MIMO DECODING METHOD

(75) Inventor: Tsuguo Maru, Minato-ku (JP)

(73) Assignee: NEC Corporation, Tokyo (JP)

( * ) Notice: Subject to any disclaimer, the term of this patent is extended or adjusted under 35 U.S.C. 154(b) by 573 days.

(21) Appl. No.: 11/909,867

(22) PCT Filed: Mar. 28, 2006

(86) PCT No.: PCT/JP2006/306282

§ 371 (c)(1),
(2), (4) Date: Nov. 15, 2007

(87) PCT Pub. No.: WO2006/104142

PCT Pub. Date: Oct. 5, 2006

(65) Prior Publication Data

US 2009/0279644 A1    Nov. 12, 2009

(30) Foreign Application Priority Data

Mar. 28, 2005  (JP)  ............................. 2005-091481

(51) Int. Cl.
*H04L 27/06* (2006.01)
*H04L 23/02* (2006.01)
(52) U.S. Cl. ...................................... 375/341; 375/262
(58) Field of Classification Search ................. 375/148, 375/260, 262, 267, 340–341, 346–350; 370/334, 370/350, 465
See application file for complete search history.

(56) References Cited

U.S. PATENT DOCUMENTS 6,351,462 B1 *  2/2002  Komatsu ..................... 370/342

(Continued)

FOREIGN PATENT DOCUMENTS

JP         9-212489 A        8/1997

(Continued)

OTHER PUBLICATIONS

Gerard J. Foschini, "Layered space-time architecture for wireless communications in a fading environment when using multiple antennas," Bell Labs Technical Journal, vol. 6, No. 2, pp. 41-59, Autumn 1996.

(Continued)

*Primary Examiner*—Khanh C Tran
(74) *Attorney, Agent, or Firm*—Sughrue Mion, PLLC

(57) ABSTRACT

A MIMO decoder, which is capable of changing a search area of a transmission signal vector in accordance with a change in a channel matrix, includes: a generalized inverse vector matrix calculation unit for calculating a generalized inverse matrix of Moore-Penrose derived from a channel matrix indicative of a radiowave propagation environment; a search area limiting processing unit for performing weighting for each eigenvector calculated from the channel matrix in inverse proportion to a square root of an eigenvalue corresponding to the eigenvector, and determines the search area of the transmission signal vector centered at the generalized inverse matrix solution of Moore-Penrose based on the weighted result; and a most likelihood estimation unit for searching for a transmission signal vector by use of a most likelihood estimation based on the search area determined by the search area limiting processing unit.

22 Claims, 10 Drawing Sheets

U.S. PATENT DOCUMENTS

| | | | |
|---|---|---|---|
| 6,876,693 B2 * | 4/2005 | Sim | 375/144 |
| 7,555,035 B2 * | 6/2009 | Shi et al. | 375/211 |
| 7,596,133 B2 * | 9/2009 | Shin et al. | 370/366 |
| 2002/0018517 A1 * | 2/2002 | Hara | 375/147 |
| 2006/0159052 A1 * | 7/2006 | Koga et al. | 370/335 |
| 2006/0285531 A1 * | 12/2006 | Howard et al. | 370/343 |

FOREIGN PATENT DOCUMENTS

| | | |
|---|---|---|
| JP | 2000-209018 A | 7/2000 |
| JP | 2003-152603 A | 5/2003 |
| JP | 2003-348057 A | 12/2003 |
| JP | 2004-282757 A | 10/2004 |
| WO | WO 03/081803 A1 | 10/2003 |
| WO | WO 2004/038952 A2 | 5/2004 |

OTHER PUBLICATIONS

Emre Telatar, "Capacity of multi-antenna Gaussian channels," European Transaction on Telecommunication, vol. 10, No. 6, pp. 585-595, Nov./Dec. 1999.

* cited by examiner

Search area within $(s-\hat{s})^H \cdot \Omega \cdot (s-\hat{s}) = c^2$ centered at
Moore-Penrose generalized inverse matrix solution $\hat{s}$ ($\lambda_1 < \lambda_2$)

601

$$\begin{bmatrix} x \\ y(\Rightarrow 0) \end{bmatrix} = \frac{1}{\alpha} \cdot \prod_{k'=0}^{\frac{K}{2}} \begin{bmatrix} 1 - s_{2k'} \cdot s_{2k'+1} \cdot 2^{-(4k'+1)} & (s_{2k'} + s_{2k'+1} \cdot 2^{-1}) \cdot 2^{-2k'} \\ -(s_{2k'} + s_{2k'+1} \cdot 2^{-1}) \cdot 2^{-2k} & 1 - s_{2k'} \cdot s_{2k'+1} \cdot 2^{-(4k'+1)} \end{bmatrix} \cdot \begin{bmatrix} y_{pq}/x_{pq} \\ 1 \end{bmatrix}$$

$s_{2k'}, s_{2k'+1}$ $\omega_{pq} = \tan^{-1}\left(\frac{y_{pq}}{x_{pq}}\right)$

$s_{2k'}, s_{2k'+1}$ $$\begin{bmatrix} X_p' \\ Y_p' \end{bmatrix} = \begin{bmatrix} x_{p1} & \cdots & x_{pp} & \cdots & x_{pq} & \cdots & x_{pi} & \cdots & x_{pm} \\ y_{p1} & \cdots & y_{pp} & \cdots & y_{pq} & \cdots & y_{pi} & \cdots & y_{pm} \end{bmatrix} \begin{bmatrix} \cos\omega_{pq} & \sin\omega_{pq} \\ -\sin\omega_{pq} & \cos\omega_{pq} \end{bmatrix} \cdot \begin{bmatrix} x_{p1} & \cdots & x_{pp} & \cdots & x_{pq} & \cdots & x_{pi} & \cdots & x_{pm} \\ y_{p1} & \cdots & y_{pp} & \cdots & y_{pq} & \cdots & y_{pi} & \cdots & y_{pm} \end{bmatrix}$$

$$= \frac{1}{\alpha} \cdot \prod_{k'=0}^{\frac{K}{2}} \begin{bmatrix} 1 - s_{2k'} \cdot s_{2k'+1} \cdot 2^{-(4k'+1)} & (s_{2k'} + s_{2k'+1} \cdot 2^{-1}) \cdot 2^{-2k'} \\ -(s_{2k'} + s_{2k'+1} \cdot 2^{-1}) \cdot 2^{-2k} & 1 - s_{2k'} \cdot s_{2k'+1} \cdot 2^{-(4k'+1)} \end{bmatrix} \cdot \begin{bmatrix} x_{p1} & \cdots & x_{pp} & \cdots & x_{pq} & \cdots & 0 & \cdots & x_{pm}' \\ y_{p1} & \cdots & y_{pp} & \cdots & y_{pq} & \cdots & y_{pm}' \end{bmatrix}$$

*where*; $e^{-j\omega_{pq}} = \cos\omega_{pq} - j\sin\omega_{pq}$, $\Omega_{pi}' = x_{pi}' + j \cdot y_{pi}'$, $\Omega_{pi} = x_{pi} + j \cdot y_{pi}$

FIG. 6C $$\begin{bmatrix} x \\ y(\Rightarrow 0) \end{bmatrix} = \frac{1}{\alpha} \prod_{k'=0}^{\frac{K}{2}} \begin{bmatrix} 1 - s_{2k'} \cdot s_{2k'+1} \cdot 2^{-(4k'+1)} & (s_{2k'} + s_{2k'+1} \cdot 2^{-1}) \cdot 2^{-2k'} \\ -(s_{2k'} + s_{2k'+1} \cdot 2^{-1}) \cdot 2^{-2k} & 1 - s_{2k'} \cdot s_{2k'+1} \cdot 2^{-(4k'+1)} \end{bmatrix} \cdot \begin{bmatrix} 1 \\ 2|\Omega_{pq}|/\Omega_{pp} - \Omega_{qq} \end{bmatrix}$$

$$2\theta = \tan^{-1}\left(\frac{2|\Omega_{pq}|}{\Omega_{pp} - \Omega_{qq}}\right)$$

$$\theta \Leftarrow 2\theta \Leftarrow \sum_{k'=0}^{\frac{K}{2}} (s_{2k'} \cdot \theta_{2k'} + s_{2k'+1} \cdot \theta_{2k'+1}) = \sum_{k'=0}^{\frac{K}{2}} (s_{2k'} \cdot \tan^{-1} 2^{-2k'} + s_{2k'+1} \cdot \tan^{-1} 2^{-2k'+1})$$

$$\theta \Rightarrow \sum_{k'=0}^{\frac{K}{2}} (s_{2k'} \cdot \theta_{2k'} + s_{2k'+1} \cdot \theta_{2k'+1}) = \sum_{k'=0}^{\frac{K}{2}} (s_{2k'} \cdot \tan^{-1} 2^{-2k'} + s_{2k'+1} \cdot \tan^{-1} 2^{-2k'+1})$$

$$where; \tan\theta_k = 2^{-k}, \quad s_{2k'}, s_{2k'+1} = \begin{cases} +1, & +1 \\ +1, & -1 \\ -1, & +1 \\ -1, & -1 \end{cases}$$

MIMO DECODER AND MIMO DECODING METHOD

TECHNICAL FIELD

The present invention relates to a most likelihood detecting method in a MIMO (Multiple-Input/Multiple-Output) space multiplex transmission used in mobile communications and the like, and more particularly, to a MIMO decoder and a MIMO decoding method which are suitable when a search area of a transmission signal vector changes in accordance with a channel matrix which changes due to variations in radiowave propagation environment and the like.

BACKGROUND ART

On radiowave propagation paths in mobile communications, radiowaves coming from a transmission antenna undergo reflections and dispersions in accordance with surrounding topologies and the like, and reach a receiver in an aggregation of elementary waves. Since respective elementary waves differ in propagation path length and phase from one another, the fading phenomenon occurs due to the arrival of such an aggregate of elementary waves which have undergone reflections and dispersions. The fading phenomenon is always an impediment for accomplishing high quality mobile communications. The conquest of poor radiowave propagation environment due to this fading has been a challenge in the mobile communication technologies over a long time, and a variety of countermeasures have been so far brought into practice.

In recent years, moves have been activated to review the fading phenomenon as environmental resources which keep therein possibilities inherent in radiowave propagation in mobile communications, instead of treating the fading phenomenon as a bad fellow. Detailed descriptions thereon are disclosed in Gerard J. Foschini [1] and Emre Telatar [2].

Also, in recent years, there is also a move of making use of environmental resources inherent in radiowave propagation paths by utilizing spatial position independency in fading variations, called multi-USER Diversity, and this can be said to be one of trends similar to those mentioned above.

In a MIMO system, a transmission side spatially multiplexes and emits transmission series using a plurality of antennas which are not correlated to one another, while a reception side receives these signal series using a plurality of antennas which are not correlated to each other, and finds transmission series which would have been originally transmitted from the transmission side, based on the received signal series, in accordance with a most likelihood estimation. Such a MIMO system disproves the conventional idea about the fading phenomenon.

Each of the foregoing documents which have led the way in the MIMO system discloses spatial transmission processing called BLAST which efficiently makes use of spatially multiplexed signals as means for making use of propagation path resources inherent in a space which is transmission media in mobile communications. Also, as an architecture for implementing the spatial demultiplexing of BLAST with low complexity, an approach called V-BLAST is disclosed which is a combination of linear filtering with interference canceller. Linear filtering generally includes a zero-forcing (ZF) norm based one which performs the restraining (nulling) of interference components, or a minimum mean square error (MMSE) norm based one. As a linear transformation for performing the nulling in accordance with the ZF norm, a generalized inverse matrix of Moore-Penrose (MP) is known, wherein ordering processing is performed for detecting in an order in which a detected SNR (signal-to-noise ratio) is simply estimated to be the highest for purposes of improving the characteristics of the interference canceller. As an operation for ordering symbols, there is known to preferentially use a column vector which has a minimum norm corresponding to a weighting vector of the Moore-Penrose generalized inverse matrix.

Alternatively, a method based on QR resolution provides an approach which further reduces the complexity. Specifically, a communication path matrix (channel matrix) H is represented by $H = Q \cdot R$ through the QR resolution, the following relationship is established between an $n_T$-th dimensional transmission antenna signal vector $X \in C^{n_T \times 1}$ and a $n_R$-th dimensional transmission antenna signal vector $Y \in C^{n_R \times 1}$:

$$Q^H \cdot Y = R \cdot X + Q^H \cdot v.$$

It should be noted that matrixes and vectors are often written in bold letter according to convention, they are sometimes written in block letter for convenience of notation in this specification. Also, the transmission antenna signal vector is herein called the transmission signal vector, and the reception antenna signal vector is called the reception signal vector. Here, $Q \in C^{n_R \times n_R}$ is a unitary matrix, and $R \in C^{n_R \times n_T}$ is an upper triangular matrix, where a noise component vector $v \in C^{n_R \times 1}$ is unitarily transformed, so that the QR resolution does not result in noise emphasis, and the transformation carried out with maintaining the distance between signal points. In this QR based resolution process, step processing can be implemented, where vectors in a matrix can be reordered such that the processing can be performed in order from the highest SNR, and detection is made in such an order that SNR is maximized (ordering). Such a method is comparable to the nulling in the ZF norm, and essentially premises that the number $n_R$ of reception antennas is equal to or larger than the number $n_T$ of transmission antennas.

However, since these methods perform $(n_T-1)$-th null production in nulling-based linear processing at the first step, they have a problem that the diversity gain can be provided only on the order of $n_R - n_T + 1$. Therefore, detection errors are likely to occur at the first step, and its influence can cause error propagation which leads to detection errors at later stages.

On the other hand, an optimal detection is performed by performing a most likelihood detection (hereinafter abbreviated as MLD) in the following equation:

$$X_{MLD} = \arg \min_{X \in |A|^{n_T}} \|Y - H \cdot X\|^2.$$

However, in MLD, since the complexity exponentially increases with respect to the number of antennas and the size $|A|$ of a modulation signal point, MLD is effectively impossible in consideration of coding. Therefore, as an approach for reducing the complexity, an approach based on turbo principles and the like are under investigation. While the foregoing equation represents MLD only for a detector, the application of a decoding method called sphere decoding (hereinafter abbreviated as SD) has been proposed in order to avoid the complexity and avoid degraded characteristics due to error propagation from the first stage to later stages in the aforementioned V-BLAST, in other words, for purposes of producing a diversity gain in a fading environment. The basic idea of SD is such that a likelihood is calculated for signal points included in a sphere centered at a reception signal point and having proper radius r, and MLD is performed in a limited range. In SD, the efficiency depends on how radius r is selected. Alternatively, there is a method of avoiding the complexity by limiting the number of signal points with the magnitude of likelihood.

In this connection, Document [3] discloses estimation based on MMSE and the turbo principle, but does not touch the most likelihood estimation. In addition, the estimation is intended for channels, not for transmission series. Likewise, while Document [4] also discloses estimation based on MMSE and the turbo principle, the most likelihood estimation is not touched therein.

Also, as a technique for improving SNR under environment where radiowave propagation conditions are not satisfactory, there is a method using an array antenna from before [5]. However, the method using an array antenna premises that antennas which make up the antenna array are correlated to one another, and is essentially different from the MIMO based method which premises that there is no correlation among a plurality of antennas.

Now, the documents referred to in this Description are listed.

[1] Gerard J. Foschini, "Layered space-time architecture for wireless communications in a fading environment when using multiple antennas," Bell Labs Technical Journal, Vol. 6, No. 2, pp. 41-59, Autumn 1996

[2] Emre Telatar, "Capacity of multi-antenna Gaussian channels," European Transaction on Telecommunication, Vol. 10, No. 6, pp. 585-595, November/December 1999

[3] JP-2003-348057A
[4] JP-2003-152603A
[5] JP-2000-209018A

DISCLOSURE OF THE INVENTION

Problem to be Solved by the Invention

In order to accomplish "whenever, wherever, and whoever," which is an ultimate purpose in mobile communications, a signal separation in space signal multiplex, which is a measure for increasing the communication path capacity, must be implemented with a stable quality resulting from higher performance and with low complexity in radiowave propagation environments which vary from one minute to the next, even if a biased dispersion state unsuitable for MIMO is caused by a peculiar reflecting object.

On the other hand, the aforementioned V-BLAST has a problem of deteriorated characteristics which are induced by the error propagation inherent in the system itself, though it can be implemented with low complexity. MLD which is an optimal detection, in turn, has a problem that it can improve the performance but with high complexity and cannot therefore be employed as it is.

It is contemplated to reduce a signal point search area for a transmission signal vector in order to reduce the complexity of MLD, and a variety of approaches have been so far proposed, including an M-Algorithm for limiting a search area, and sphere decoding (SD).

Incidentally, an MIMO system which intends to increase a transmission path capacity through space signal multiplexing, is characterized in that its performance tends to depend on a radiowave propagation environment. However, investigations on the MIMO system have been so far made principally on i.i.d channels (independent identically distributed channel), i.e., channels which statistically have the same propagation path characteristics and no correlation among transmission/reception antenna elements, and a variety of algorithms which limit the signal search area are also investigated in many cases on the premise of the i.i.d channels. In other words, a general MIMO propagation environment is the i.i.d channel, and a probability distribution of eigenvalues of its variance matrix is a Weshard distribution.

However, the dispersion is often limited by peculiar reflectors in actual environment, in which case, the i.i.d environment no longer is established, but a peculiar eigenvalue distribution is present. As a result, a search area which should be appropriate is biased. Therefore, a variety of simplified algorithms mentioned above which limit an optimal search area on the assumption of the i.i.d channel, no longer limit an optimal search area when moved into a radiowave propagation environment in a dispersion state which is not suitable for MIMO by a non-uniform reflector, and has a problem of inabilities to accomplish a stable quality resulting from higher performance essential to MLD. Alternatively, it is contemplated, on the contrary, that the degree of limitation to a search area is mitigated to prevent degraded characteristics on the assumption of a radiowave propagation environment in a biased dispersion state which is not suitable for MIMO. In this event, however, MIMO fails to produce the effect of simplifying the algorithm, approaches to highly complex MLD, and can no longer be implemented at low complexity.

The present invention has been made in view of the problems mentioned above, and it is an object of the present invention to provide a MIMO decoder which accomplishes a signal separation in space signal multiplexing, which is a measure for increasing a communication path capacity, with a stable quality resulting from higher performance and with low complexity, in order to implement "whenever, wherever, and whoever" which is an ultimate purpose in mobile communications, even when a radiowave propagation environment, which varies from one minute to the next, moves into a biased dispersion state which is not suitable for MIMO. In other words, it is an object of the invention to effectively operate MIMO by most efficiently search with a minimum search area, i.e., with a minimum circuit scale even when moving into a biased dispersion state which is not suitable for MIMO.

In implementing such a MIMO decoder, it is essential to extract eigenvalues and eigenvectors with low complexity, and it is another object of the present invention to provide means which is capable of executing eigenvalue and eigenvector extraction processing without increasing the complexity, viewed as a whole, by executing a Jacobean rotation calculation which is configured with low complexity and at high speeds.

Means for Solving the Problem

According to a first aspect of the present invention, a MIMO decoder includes: generalized inverse matrix calculating means for calculating a Moore-Penrose generalized inverse matrix derived from a channel matrix indicative of a radiowave propagation environment or a virtual channel matrix based on a virtual propagation path; and searching means for searching a transmission signal vector centered at a generalized inverse matrix solution calculated by the generalized inverse matrix calculating means, wherein a search area of the transmission signal vector is variable in response to a change in the channel matrix or the virtual channel matrix, and the searching means performs weighting for each eigenvector calculated from the channel matrix or the virtual channel matrix in inverse proportion to the square root of an eigenvalue corresponding to the eigenvector, and determines the search area of the transmission signal vector based on the weighted result.

According to a second aspect of the present invention, a MIMO decoder includes: minimum mean square error norm calculating means for executing processing based on a minimum mean square norm from a channel matrix indicative of a radiowave propagation environment or a virtual channel matrix based on a virtual propagation path; and searching means for searching a transmission signal vector centered at a detection result calculated by the minimum mean square error norm calculating means, wherein a search area of the transmission signal vector is variable in response to a change in the channel matrix or the virtual channel matrix, and the searching means performs weighting for each eigenvector calculated from the channel matrix or the virtual channel matrix in inverse proportion to a square root of an eigenvalue corresponding to the eigenvector, and determines the search area of the transmission signal vector based on the weighted result.

In the present invention, the searching means may perform the weighting in inverse proportion to the square root of a minimum eigenvalue, among the calculated eigenvalues, for an eigenvector corresponding to the minimum eigenvalue, and perform the weighting for each eigenvector corresponding to an eigenvalue except for the minimum eigenvalue in inverse proportion to the square root of each eigenvalue corresponding to each eigenvector for a scalar amount corresponding to each eigenvector. In this event, the searching means may select an eigenvector corresponding to the minimum eigenvalue and give a width of the search area for each element in the selected eigenvector in a form inversely proportional to the square root of each eigenvalue except for the minimum eigenvalue while maintaining each element relationship within the selected eigenvector.

In the present invention, factorizing means may be provided for calculating the eigenvalue and eigenvector using Jacobean rotation, and sequentially factorizing a rotating angle in the Jacobean rotation for each group as a siged sum of a plurality of arctangents for 2's negative power, when the eigenvalue and eigenvector are calculated based on the channel matrix or virtual channel matrix, wherein a rotation matrix is used for the Jacobean rotation, the rotation matrix having elements which are linear sums of 2's negative powers configured based on a plurality of polarities for each of the groups formed by the factorizing means. Such factorizing means includes, for example, a memory having arctangents for a plurality of 2's negative powers different from one another as values for each group, means for generating an address indicative of a group of the memory, and means for comparing an accumulation result of a signed sum of a plurality of arctangent data read from the memory and the signed sums up to the preceding time with a Jacobean rotation angle, wherein the result of the comparison is designated as a polarity of a current in-group arctangent.

In the present invention, the virtual channel matrix may include a contribution based on incompleteness of a transceiver.

According to a third aspect of the present invention, a MIMO decoding method includes: a step of receiving a transmission signal to acquire a transmission signal vector; a step of calculating a Moore-Penrose generalized inverse matrix derived from a channel matrix indicative of a radiowave propagation environment or a virtual channel matrix indicative of a virtual propagation path; a step of calculating an eigenvalue and an eigenvector based on the channel matrix or the virtual channel matrix; and a search step of searching the transmission signal vector centered at a generalized inverse matrix solution of Moore-Penrose, wherein a search area of the transmission signal vector is variable in response to a change in the channel matrix or the virtual channel matrix, and in the search step, weighting is performed for each eigenvector calculated from the channel matrix or the virtual channel matrix in inverse proportion to a square root of an eigenvalue corresponding to the eigenvector, and the search area of the transmission signal vector is determined based on the weighted result.

According to a fourth aspect of the present invention, a MIMO decoding method includes: a step of receiving a transmission signal to acquire a transmission signal vector; executing processing based on a minimum mean square error norm from a channel matrix indicative of a radiowave propagation environment or a virtual channel matrix indicative of a virtual propagation path; a step of calculating an eigenvalue and an eigenvector based on the channel matrix or the virtual channel matrix; and a search step of searching the transmission signal vector centered at a detection result by the processing based on the minimum mean square error norm, wherein a search area of the transmission signal vector is variable in response to a change in the channel matrix or the virtual channel matrix, and in the search step, weighting is performed for each eigenvector calculated from the channel matrix or the virtual channel matrix in inverse proportion to a square root of an eigenvalue corresponding to the eigenvector, and the search area of the transmission signal vector is determined based on the weighted result.

In the present invention, a search area of a transmission signal vector can be changed in accordance with a channel matrix or a virtual channel matrix which changes due to variations in radiowave propagation environment, and the search area is determined by eigenvectors which are weighted so as to be inversely proportional to the square root of eigenvalues calculated based on the channel matrix or virtual channel matrix, so that even if the environment falls into a biased dispersion state which is not suitable for MIMO, a signal separation in space signal multiplexing which is a measure for increasing a communication path capacity can be realized with a stable quality resulting from higher performance and with low complexity. Accordingly, the present invention provides means for realizing "whenever, wherever, and whoever" which is an ultimate purpose of the mobile communication.

In such a MIMO decoder, when a transmission signal vector is searched about a generalized inverse matrix solution of Moore-Penrose as a center in conformity to a channel matrix or a virtual channel matrix which varies from one minute to the next, a search area of the transmission signal vector is determined by a hyperellipse, the axes of which are eigenvectors which are weighted so as to be inversely proportional to eigenvalues derived based on the channel matrix or virtual channel matrix. In this event, while the detection of the eigenvalues and eigenvectors is a bottleneck of the processing, in the present invention, when the eigenvalues and eigenvectors are extracted through Jacobean rotation, a rotating angle is sequentially factorized for each group as a signed sum of a plurality of arctangents for 2's negative powers as "Factorization & Grouping," and the Jacobean rotation is performed using a rotation matrix having elements which are linear sums of 2's negative powers configured based on a plurality of polarities for each group, derived as a result. By configuring in this way, the calculation of the Jacobean rotation can be performed with a hardware configuration which comprises only processing of 2's negative powers by wire replacement (switch) on a circuit, and an adder, thus simultaneously achieving both lower complexity and higher speed resulting from the grouping. In this way, the present invention realizes "whenever, wherever, and whoever" which is an ultimate purpose of the mobile communication in the MIMO system as well.

With the employment of the configuration as described above, according to the present invention, "whenever, wherever, and whoever," which is an ultimate purpose of the mobile communication, can be realized in the MIMO system as well. According to the present invention, the signal separation in space signal multiplexing which is a measure for increasing the communication capacity can be implemented with a stable quality resulting from higher performance and with low complexity even when the radiowave propagation environment which varies from one minute to the next moves into a biased dispersion state which is not suitable for MIMO.

The present invention provides means for implementing the extraction of eigenvalues and eigenvectors of a channel matrix or a virtual channel matrix through the Jacobean rotation with low complexity and even at high speeds. Since this processing of extracting the eigenvalues and eigenvectors is required to be performed only once per frame, this processing is characterized by lower complexity, as compared with MLD which requires the processing every time, and the complexity is further reduced when viewed as a whole. As described above, when the eigenvalues and eigenvectors are extracted through Jacobean rotation, a rotating angle is sequentially factorized for each group as a signed sum of a plurality of arctangents for 2's negative powers, and a rotation matrix having elements which are linear sums of 2's negative powers configured based on a plurality of polarities for each group derived as the result can be used for the Jacobean rotation, so that the matrix operation with elements which are linear sums of 2's negative powers can be implemented only by a wire replacement on a circuit and an adder as the hardware components. Accordingly, the present invention can provide low-complexity and high-speed implementing means which can be increased in speed through grouping.

In the present invention, a MIMO decoder having a stabilized quality resulting from higher performance can be implemented with low complexity by searching a transmission signal vector centered at a detection result based on a minimum mean square error (MMSE norm) norm instead of calculating a generalized inverse matrix of Moore-Penrose.

In the present invention, when the search area is set for the transmission signal vector, the processing of determining a search area of the transmission signal vector can be simplified by performing weighting for an eigenvector corresponding to a minimum eigenvalue, among calculated eigenvalues, in inverse proportion to the square root of the minimum eigenvalue, and performing weighting for each eigenvector corresponding to an eigenvalue except for the minimum eigenvalue in inverse proportion to the square root of each eigenvalue corresponding to each of these eigenvectors for a scalar amount corresponding to each of these eigenvectors. In this event, the processing of determining the search area of the transmission signal vector can be further simplified by selecting the eigenvector corresponding to the minimum eigenvalue, and giving a width of the search area for each element in the selected eigenvector in a form inversely proportional to the square root of each eigenvalue except for the minimum eigenvalue while maintaining each element relationship within a selected eigenvalue corresponding to the minimum eigenvalue.

BRIEF DESCRIPTION OF THE DRAWINGS

FIG. 6B is a diagram for describing $\omega_{pq}$-polarity detection unit in the Jacobean rotation operation unit;

FIG. 6C is a diagram for describing a unitary matrix operation unit in the Jacobean rotation operation unit;

FIG. 6D is a diagram for describing a 2θ-polarity detection unit in the Jacobean rotation operation unit;

FIG. 6E is a diagram for describing a 2θ-restoration unit in the Jacobean rotation operation unit;

FIG. 6F is a diagram for describing a θ-polarity detection unit in the Jacobean rotation operation unit;

DESCRIPTION OF REFERENCE NUMERALS

Figure 1:
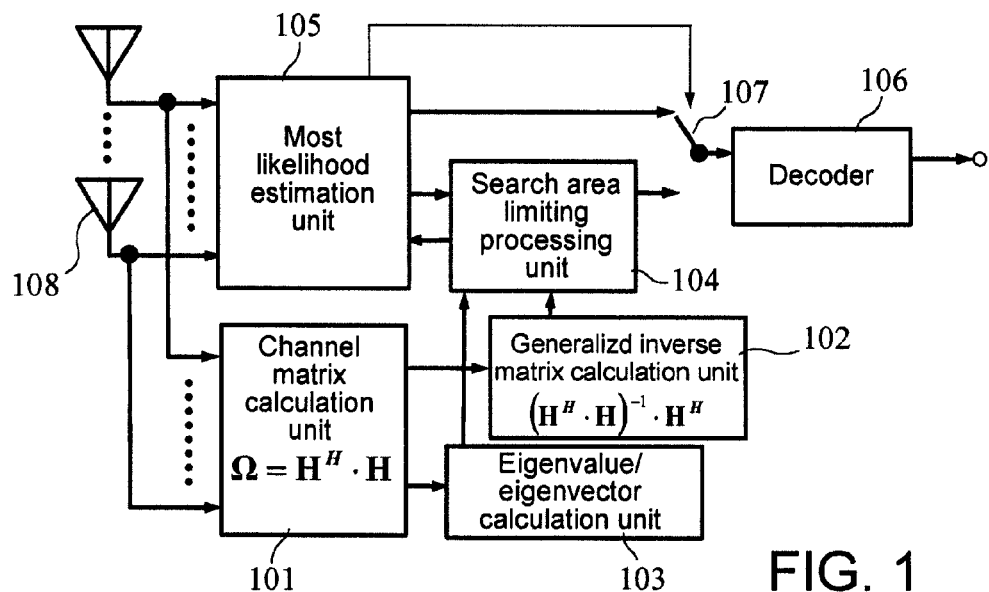
FIG. 1 is a diagram showing an exemplary search area limiting process with eigenvalues and eigenvectors shown in the case of two-dimensional real numbers.

101 Channel matrix calculation unit,
102 Generalized inverse matrix calculation unit,
103 Eigenvalue/eigenvector calculation unit,
104 Search area limiting processing unit,
105 Most likelihood estimation unit,
106 Decoder,
107 Switch,
108 Reception antenna,
601 $\omega_{pq}$-polarity detection unit,
602 Unitary matrix operation unit,
603 2θ-polarity detection unit,
604 2θ-restoration unit,
605 θ-polarity detection unit,
606 Rotation matrix operation unit,
607 Completion condition comparison processing,
701 Eigenvector calculation unit,
702 Eigenvalue calculation unit,
703 Jacobean rotation operation unit, 801, 901 Memories,
802, 902 Address generating circuit,
803 Signed adder,
804, 906 Registers,
805 Comparator,
806 Polarity selector,
807 Subtractor,
808, 904, 905 Adders,
809 Selector,
903 Polarizing circuit

BEST MODE FOR CARRYING OUT THE INVENTION

Next, preferred exemplary embodiments of the present invention will be described with reference to the drawings. First, a theoretical background of the present invention will be shown in an analytical fashion.

A variety of calculation amount reducing techniques have been conventionally known in MIMO systems, where the complexity thereof is attributable to a proper limiting process for a search area of a transmission signal vector which would has been transmitted from a transmission antenna, or a search area for each element in the transmission vector. Accordingly, first shown is that the proper search area differs in different radiowave propagation environments in an analytical fashion.

Assuming that a reception signal vector y(i) having $n_R$ reception antennas at sampling time i is represented by:

$$y(i) = \begin{bmatrix} y_1(i) \\ y_2(i) \\ \vdots \\ y_{n_R}(i) \end{bmatrix}, \quad (1)$$

and a transmission signal vector s(i) having $n_T$ transmission antennas is represented by:

$$s(i) = \begin{bmatrix} s_1(i) \\ s_2(i) \\ \vdots \\ s_{n_T}(i) \end{bmatrix}, \quad (2)$$

then, using a channel matrix $H \in C^{n_R \times n_T}$, the following equations stand:

$$y(i) = H \cdot s(i) + v(i) \quad i = 1 \ldots N, \quad (3)$$

$$\begin{bmatrix} y_1(i) \\ y_2(i) \\ \vdots \\ y_{n_R}(i) \end{bmatrix} = \begin{bmatrix} h_{11} & h_{12} & \ldots & h_{1n_T} \\ h_{21} & h_{22} & \ldots & h_{2n_T} \\ \vdots & \vdots & \ddots & \vdots \\ h_{n_R 1} & h_{n_R 2} & \ldots & h_{n_R n_T} \end{bmatrix} \cdot \begin{bmatrix} s_1(i) \\ s_2(i) \\ \vdots \\ s_{n_T}(i) \end{bmatrix} + \begin{bmatrix} v_1(i) \\ v_2(i) \\ \vdots \\ v_{n_R}(i) \end{bmatrix}, \quad (4)$$

where v(i) is a vector having $N_c(0, I_{nR})$ in its elements.

In the following, y(i) and the like may be simply written such as y when no confusion of notation can occur.

Since transmission signal vector s(i) is most likelihood detected (MLD) under such a condition, the following is derived:

$$\arg\min_{s \in A^{n_T}} \|y - H \cdot s\|^2, \quad (5)$$

where $$\|y - H \cdot s\|^2 = (y - H \cdot s)^H \cdot (y - H \cdot s) = (y^H - s^H \cdot H^H) \cdot (y - H \cdot s) = \quad (6)$$
$$y^H \cdot y - s^H \cdot H^H \cdot y - y^H \cdot H \cdot s + s^H \cdot H^H \cdot H \cdot s.$$

On the other hand, $$(s - \hat{s})^H \cdot H^H \cdot H \cdot (s - \hat{s}) = \quad (7)$$
$$\{s - (H^H \cdot H)^{-1} \cdot H^H \cdot y\}^H \cdot H^H \cdot H \cdot \{s - (H^H \cdot H)^{-1} \cdot H^H \cdot y\} \text{ where;}$$
$$\hat{s} = (H^H \cdot H)^{-1} \cdot H^H \cdot y = \{s^H - y^H \cdot (H^H \cdot H)^{-1}\} \cdot (H^H \cdot H) \cdot$$
$$\{s - (H^H \cdot H)^{-1} \cdot H^H \cdot y\} \text{ where; } \because \Omega = H^H \cdot H, \text{ then } (\Omega^{-1})^H =$$
$$\Omega^{-1} = \{s^H \cdot (H^H \cdot H) - y^H \cdot H\} \cdot \{s - (H^H \cdot H)^{-1} \cdot H^H \cdot y\} =$$
$$s^H \cdot (H^H \cdot H) \cdot s - s^H \cdot H^H \cdot y -$$
$$y^H \cdot H \cdot s + y^H \cdot H \cdot (H^H \cdot H)^{-1} \cdot H^H \cdot y.$$

Subtraction of Equation (6) from Equation (7) results in:

$$(s - \hat{s})^H \cdot H^H \cdot H \cdot (s - \hat{s}) - \|y - H \cdot s\|^2 = \quad (8)$$
$$y^H \cdot H \cdot (H^H \cdot H)^{-1} \cdot H^H \cdot y - y^H \cdot y =$$
$$y^H \cdot \{H \cdot (H^H \cdot H)^{-1} \cdot H^H - 1\} \cdot y,$$

from which the following equation is derived:

$$\|y - H \cdot s\|^2 = (s - \hat{s})^H \cdot H^H \cdot H \cdot (s - \hat{s}) - y^H \cdot \{H \cdot (H^H \cdot H)^{-1} \cdot H^H - I\} \cdot y \quad (9).$$

Since the most likelihood estimation is performed for transmission signal vector s under previously received reception signal vector y, the second term of the right side of Equation (9) has been established, and $$\hat{s} = (H^H \cdot H)^{-1} \cdot H^H \cdot y \quad (10)$$

has been established by a Moore-Penrose generalized inverse matrix solution. Therefore, Equation (5) results in the following Equation (11):

$$\arg\min_{s \in A^{n_T}} (s - \hat{s})^H \cdot H^H \cdot H \cdot (s - \hat{s}) = \quad (11)$$
$$\arg\min_{s \in A^{n_T}} (s - \hat{s})^H \cdot \Omega \cdot (s - \hat{s}) \text{ where;}$$
$$\hat{s} = (H^H \cdot H)^{-1} \cdot H^H \cdot y, \Omega = H^H \cdot H.$$

In Equation (11), (s−ŝ) which gives a minimum under a constraining condition of the unit Euclid square distance centered at the Moore-Penrose generalized inverse matrix solution ŝ can be analytically found using a method of undetermined multipliers of Lagrange. Specifically, assuming that the constraining condition is φ(s−ŝ)=0, the following stands:

$$\phi(s-\hat{s}) = (s-\hat{s})^H \cdot (s-\hat{s}) - 1 = 0 \quad (12).$$

Assuming that an evaluation function under this condition is $f(s-\hat{s})$, $$f(s-\hat{s})=(s-\hat{s})^H \cdot \Omega \cdot (s-\hat{s}) \quad (13)$$

is derived. Accordingly, the following equation is derived using constant $\lambda$:

$$u = \qquad (14)$$
$$f(s-\hat{s}) - \lambda \cdot \varphi(s-\hat{s}) = (s-\hat{s})^H \cdot \Omega \cdot (s-\hat{s}) - \lambda \cdot \left((s-\hat{s})^H \cdot (s-\hat{s}) - 1\right).$$

Therefore, $(s-\hat{s})$ which unconditionally brings this u to an extreme value maybe found.

A differentiation with respect to a vector $(s-\hat{s})$ can be solved by a conjugate derivative $$\left(2 \cdot \frac{\partial}{\partial(s-\hat{s})^*}\right).$$

Since $(s-\hat{s})$ which satisfies:

$$\frac{1}{2}\frac{\partial u}{\partial(s-\hat{s})} = \frac{\partial u}{\partial(s-\hat{s})^*} = \Omega \cdot (s-\hat{s}) - \lambda \cdot (s-\hat{s}) = 0 \quad (15)$$

may be found, the following equation is derived:

$$\Omega \cdot (s-\hat{s}) = \lambda \cdot (s-\hat{s}) \text{ where; } \hat{s}=(H^H \cdot H)^{-1} \cdot H^H \cdot y, \; \Omega = H^H \cdot H \quad (16).$$

Equation (16) is nothing but the definition of an eigenvector and an eigenvalue.

Accordingly, the vector $(s-\hat{s})$ which minimizes (maximizes) the evaluation function $f(s-\hat{s})=(s-\hat{s})^H \cdot \Omega \cdot (s-\hat{s})$ under the constraining condition of $\phi(s-\hat{s})$ exists in eigenvectors $(s_1-\hat{s}), (s_2-\hat{s}), \ldots, (s_n-\hat{s})$ which correspond to eigenvalues $\lambda_1, \lambda_2, \ldots, \lambda_n$ of $\Omega = H^H \cdot H$. Multiplying both sides of Equation (16) by $(s-\hat{s})^H$ from the left results in:

$$(s-\hat{s})^H \cdot \Omega \cdot (s-\hat{s}) = \lambda \cdot (s-\hat{s})^H \cdot (s-\hat{s}) = \lambda \quad (17).$$

Therefore, a minimum value (maximum value) of the evaluation function $f(s-\hat{s})=(s-\hat{s})^H \cdot \Omega \cdot (s-\hat{s})$ is a minimum eigenvalue (maximum eigenvalue) $\lambda_{min}$ ($\lambda_{max}$) itself, and the vector $(s-\hat{s})$ at that time is an eigenvector for $\lambda_{min}$ ($\lambda_{max}$).

Transmission signal vector s is most likelihood estimated using the foregoing relationship, wherein this problem has been actually known as an NP completion problem, and cannot be expected to be analytically solved any more. As such, a solution is found by a search.

Now, a Hermitian matrix $\Omega = H^H \cdot H$ is spectrally factorized, the following equation is derived:

$$\Omega = H^H \cdot H = \sum_{n=1}^{n} \lambda_n \cdot e_n \cdot e_n^H, \quad (18)$$

where $\lambda_n$ is an eigenvalue, $e_n$ is a normalized eigenvector, and $\{e_n\}$ is a normal orthogonal system. For arbitrary transmission signal vector s:

$$(s-\hat{s})^H \cdot \Omega \cdot (s-\hat{s}) = \sum_{n=1}^{N} \lambda_n \cdot (s-\hat{s})^H \cdot e_n \cdot e_n^H \cdot (s-\hat{s}) \quad (19)$$
$$= \sum_{n=1}^{N} \lambda_n \cdot \left((s-\hat{s})^H \cdot e_n\right) \cdot \left((s-\hat{s})^H \cdot e_n\right)^H$$
$$= \sum_{n=1}^{N} \lambda_n \cdot \|(s-\hat{s})^H \cdot e_n\|^2$$

where;

$$N = \min\{n_T, n_R\}.$$

Since $\Omega$ is a Hermitian matrix, its eigenvalues $\lambda_n$ are all real numbers and non-negative without fail.

Assuming now that a scalar value is represented by:

$$t_n = (s-\hat{s})^H \cdot e_n \; n = 1 \sim N \quad (20)$$

for transmission signal vector s which satisfies $(s-\hat{s})^H \cdot \Omega \cdot (s-\hat{s}) = c^2$ for arbitrary c, from Equation (19), $$c^2 = \lambda_1 \cdot |t_1|^2 + \lambda_2 \cdot |t_2|^2 + \ldots + \lambda_N \cdot |t_N|^2 \quad (21)$$

$$\therefore 1 = \frac{|t_1|^2}{\left(\frac{c}{\sqrt{\lambda_1}}\right)^2} + \frac{|t_2|^2}{\left(\frac{c}{\sqrt{\lambda_2}}\right)^2} + \ldots + \frac{|t_N|^2}{\left(\frac{c}{\sqrt{\lambda_N}}\right)^2}$$

is a hyperellipse. Therefore, $$(s-\hat{s}) = \frac{c}{\sqrt{\lambda_1}} \cdot e_1$$

is represented as $$(s-\hat{s})^H \cdot \Omega \cdot (s-\hat{s}) = \lambda_1 \cdot \left\|\frac{c}{\sqrt{\lambda_1}} e_1^H \cdot e_1\right\|^2 = c^2,$$

and $$(s-\hat{s}) = \frac{c}{\sqrt{\lambda_2}} \cdot e_2$$

gives a proper distance in an $e_2$ direction.

Specifically, transmission signal vector s which satisfies $(s-\hat{s})^H \cdot \Omega \cdot (s-\hat{s}) = c^2$ has a length inversely proportional to the square root of the eigenvalues centered at the Moore-Penrose generalized inverse matrix solution $\hat{s}$, and exists on a hyperellipse, the axes of which are given by the eigenvectors of $\Omega = H^H \cdot H$.

From the ease of description of intuitive understanding, a simple example shown in the case of two-dimensional real elements is shown in FIG. 1. From FIG. 1, a search area within $(s-\hat{s})^H \cdot \Omega \cdot (s-\hat{s}) = c^2$ defines an ellipse $c^2 = \lambda_1 \cdot |(s-\hat{s}) \cdot e_1|^2 + \lambda_2 \cdot |(s-\hat{s}) \cdot e_2|^2$ the axes of which are given by the eigenvectors.

$$(s-\hat{s}) = \frac{c}{\sqrt{\lambda_1}} \cdot e_1$$

is represented as $$(s-\hat{s})^H \cdot \Omega \cdot (s-\hat{s}) = \lambda_1 \cdot \left\| \frac{c}{\sqrt{\lambda_1}} e_1^H \cdot e_1 \right\|^2 = c^2,$$

and shows an optimal search area in an $e_1$ direction.

$$(s-\hat{s}) = \frac{c}{\sqrt{\lambda_2}} \cdot e_2$$

is represented as $$(s-\hat{s})^H \cdot \Omega \cdot (s-\hat{s}) = \lambda_2 \cdot \left\| \frac{c}{\sqrt{\lambda_2}} e_2^H \cdot e_{21} \right\|^2 = c^2,$$

and shows an optimal search area in the $e_2$ direction. In other words, a search region $c^2 = \lambda_1 \cdot |t_1|^2 + \lambda_2 \cdot |t_2|^2$ on an ellipse which has a length inversely proportional to the square root of the eigenvalue, and the axes of which are given by the eigenvectors, presents an optimal search area.

Figure 2:
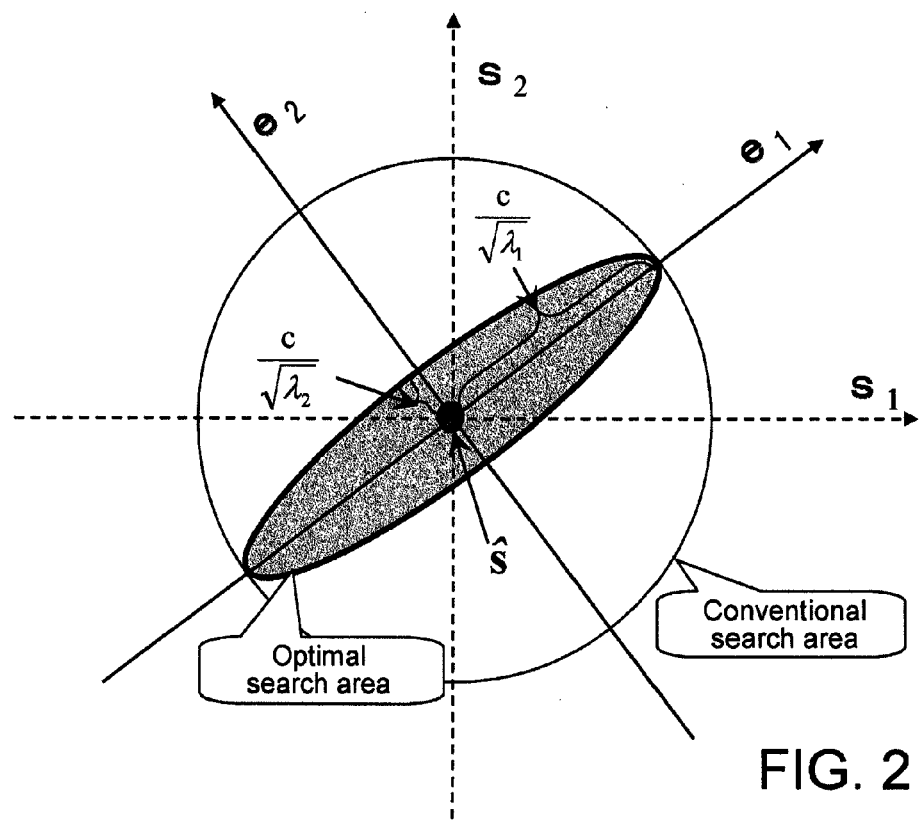
FIG. 2 is a block diagram illustrating the configuration of a MIMO decoder according to a first exemplary embodiment of the present invention.

On the other hand, a conventional search area is in the form of circle shown in FIG. 2 because a search is made in all directions. Therefore, when an attempt is made to achieve performance similar to the case of the search area using the eigenvalues of the present invention by the conventional method, it is understood that the search area is a wider circular area including an ellipse which is an optimal range and that the appropriate limiting processing is not carried out. Conversely, when a search is made in an equivalent area, the circle has a smaller radius, resulting in degraded characteristics because the circle does not include an area in which the search should be essentially made.

These eigenvalues and eigenvectors are found from channel matrix H which represents a radiowave propagation environment. Accordingly, when the radiowave propagation environment which varied from one minute to the next moves into a biased dispersion environment which is not suitable for MIMO, the eigenvalue distribution changes. While FIG. 2 is drawn on the assumption that $\lambda_1 < \lambda_2$ is satisfied, the eigenvalue distribution spreads when the radiowave propagation environment changes into a biased dispersion state which is not suitable for MIMO (in a state in which antennas are correlated to one another, and the i.i.d channel is no longer present). Specifically, describing with reference to FIG. 2, the difference between $\lambda_1$ and $\lambda_2$ will further increase. As a result, a difference further increases between the search area of the present invention using the eigenvalues and the conventional omni-directional circular search area, and when the same area $(s-\hat{s})^H \cdot \Omega \cdot (s-\hat{s}) = c^2$ is to be ensured, the conventional method gives rise to such problems that it is obliged to increase the radius of the circle for countermeasures with complexity close to that of MLD, or the characteristics are degraded in the same search area.

On the other hand, the method of the present invention using the eigenvalues provides an optimal search area defined by minimum requirements of $(s-\hat{s})^H \cdot \Omega \cdot (s-\hat{s}) = c^2$ so that a stable quality can be accomplished with high performance without increasing the complexity.

The foregoing description has been given to show that a proper search area for the transmission signal vector, or a proper search area for each element of the transmission vector differs depending on the radiowave propagation environment.

Next, a description will be given of the configuration of a MIMO decoder according to a first exemplary embodiment of the present invention. FIG. 2 is a block diagram illustrating the general configuration of the MIMO decoder.

$N_R$ reception antennas 108 are connected to the MIMO decoder. The MIMO decoder includes: channel matrix calculation unit 101 for receiving a reception signal (reception series) from each reception antenna 108 to calculate channel matrix H and calculate $Q = H^H \cdot H$; generalized inverse matrix calculation unit 102 for calculating a generalized inverse matrix of Moore-Penrose related to channel matrix H; eigenvalue/eigenvector calculation unit 103 for calculating eigenvalues and eigenvectors of channel matrix H; search area limiting processing unit 104 for executing a process for limiting a search area based on the Moore-Penrose generalized inverse matrix calculated by generalized inverse matrix calculation unit 102 and the eigenvalues and eigenvectors calculated by eigenvalue/eigenvector calculation unit 103; most likelihood estimation unit 105 for receiving the reception series from reception antennas 108 to perform a most likelihood estimation in a search area limited by search area limiting processing unit 104; decoder 106 for decoding signal series; and switch 107 for switching the input to decoder 106.

Though not particularly illustrated herein, transmission signal vectors sent from $n_T$ transmission antennas on the transmission side arrive at $n_R$ reception antennas 108 through a radiowave propagation path which varies from one minute to the next. The $n_R$ signals which are input signals are treated as reception signal vector y, a virtual transmission path may be treated as including even an RF (radio frequency) front end, a matching filter, and a whitening filter through the radiowave propagation path from a transmitter, and the result of multiplication of a virtual channel matrix which models the virtual propagation path may be treated as vector y. In addition, incompleteness of transmitter/receiver may also treated as included in this virtual channel matrix.

In this MIMO decoder, when the channel matrix or virtual channel matrix changes due to variations in the radiowave propagation environment or the like, a search area for transmission vector changes in accordance with the thus changing channel matrix or virtual channel matrix. Thus, search area limiting processing unit 104 processes such that a transmission signal vector is searched as centered at a generalized inverse matrix solution of Moore-Penrose, in which case the eigenvectors of the channel matrix (or virtual channel matrix) is weighted in inverse proportion to the square roots of the eigenvalues of the channel matrix (or virtual channel matrix), such that the search area is determined by the weighted eigenvectors.

Next, a description will be given of the operation of the MIMO decoder illustrated in FIG. 2.

The transmission side transmits an orthogonal pilot signal which is different for each transmission antenna before transmitting user data such that channel matrix H can be estimated on the reception side. This pilot signal is received by reception antennas 108, and as a result, channel matrix calculation unit 101 executes a calculation of:

$$\Omega = H^H \cdot H \tag{22}$$

where H is the channel matrix or the aforementioned virtual channel matrix. Also, simultaneously, generalized inverse matrix calculation unit 102 calculates:

$$(H^H \cdot H)^{-1} \cdot H^H \tag{23}$$

using this operation result. Eigenvalue/eigenvector calculation unit 103 calculates eigenvalues $\lambda_1, \lambda_2, \ldots, \lambda_n$ and eigenvectors $e_1, e_2, \ldots, e_n$ from $\Omega$ through Jacobean rotation, later described.

Search area limiting processing unit 104 calculates a search area which has the origin at the center to conform to a previously set search region constant $(s-\hat{s})^H \cdot \Omega \cdot (s-\hat{s}) = c^2$ based on eigenvalues $\lambda_1, \lambda_2, \ldots, \lambda_n$ and eigenvectors $e_1, e_2, \ldots, e_n$ sent from eigenvalue/eigenvector calculation unit 103. Specifically, search area limiting processing unit 104 determines a hyperellipse formed by $$\frac{c}{\sqrt{\lambda_1}} \cdot e_1, \frac{c}{\sqrt{\lambda_2}} \cdot e_2, \ldots, \frac{c}{\sqrt{\lambda_n}} \cdot e_n$$

which are lengths inversely proportional to the square root of the eigenvalues with each eigenvector defining an axis. Since this processing need be performed only once per frame, relatively slow processing can be done as compared with a most likelihood estimation (MLD) which requires the processing every time, as will be later described.

Next, since user data is sent from the transmitter, search area limiting processing unit 104 calculates generalized inverse matrix solution $(H^H \cdot H)^{-1} \cdot H^H \cdot y$ using reception signal vector y and $(H^H \cdot H)^{-1} \cdot H^H$ which is the result of the operation from generalized inverse matrix calculation unit 102, and uses the result as a center value of the search area:

$$\hat{s} = (H^H \cdot H)^{-1} \cdot H^H \cdot y \qquad (24).$$

In this way, a final search area is determined. Subsequently, most likelihood estimation unit 105 executes a search in the search area set by search area limiting processing unit 104 to narrow down to the closest transmission signal vector, and supplies it to decoder 106 as required as a logarithmic likelihood ratio. Also, when no transmission signal vector under estimation exists in the limited search area, switch 107 switches the input to decoder 106 to search area limiting processing unit, so as to supply decoder 106 with generalized inverse matrix solution $(H^H \cdot H)^{-1} \cdot H^H \cdot y$ of Moore-Penrose calculated in search area limit processing unit 104 or a signal representative of the logarithmic likelihood ratio as required.

In the foregoing description, the generalized inverse matrix solution of Moore-Penrose is used as an estimate when no transmission signal vector exists at the center of the search area or within the search area. For accomplishing higher performance and more stable quality, processing based on a minimum mean square error (MMSE norm) norm calculated by Equation (25) may be replaced with the generalized inverse matrix calculation of Moore-Penrose.

$$\left\{ H^H \cdot H + \frac{n_T \cdot \sigma^2}{P} \cdot I \right\}^{-1} \cdot H^H. \qquad (25)$$

Next, a description will be given of a MIMO decoder according to a second exemplary embodiment of the present invention. While the first exemplary embodiment has been described in connection with elements of real number for intuitive understanding and ease of explanation, the second exemplary embodiment will be described in connection with elements of complex number in consideration of two-dimensional modulation as well. This exemplary embodiment is characterized by showing a method of implementation with low complexity by a combination of vector with scalar.

A description will be first given assuming a simple example. Since elements of a matrix are complex numbers, a two-dimensional channel matrix is given as an example, where each eigenvector having a single element in an orthogonal relationship, for convenience of explanation.

It is considered that:

$$H = \begin{bmatrix} \sqrt{\lambda_1} \cdot \exp[j\theta_1] & 0 \\ 0 & \sqrt{\lambda_2} \cdot \exp[j\theta_2] \end{bmatrix} \text{ where; } \lambda_1 < \lambda_2. \qquad (26)$$

From $\Omega = H^H \cdot H$, $$\Omega = \begin{bmatrix} \sqrt{\lambda_1} \cdot \exp[-j\theta_1] & 0 \\ 0 & \sqrt{\lambda_2} \cdot \exp[-j\theta_2] \end{bmatrix}. \qquad (27)$$

$$\begin{bmatrix} \sqrt{\lambda_1} \cdot \exp[j\theta_1] & 0 \\ 0 & \sqrt{\lambda_2} \cdot \exp[j\theta_2] \end{bmatrix} = \begin{bmatrix} \lambda_1 & 0 \\ 0 & \lambda_2 \end{bmatrix}$$

is derived, and from this equation, the eigenvalues and eigenvectors are represented as follows:

First Eigenvalue and Eigenvector;

$$\lambda_1, e_1 = \begin{bmatrix} x \\ 0 \end{bmatrix},$$

Second Eigenvalue and Eigenvector;

$$\lambda_2, e_2 = \begin{bmatrix} 0 \\ y \end{bmatrix},$$

from the relationships of $$\begin{bmatrix} \lambda_1 & 0 \\ 0 & \lambda_2 \end{bmatrix} \cdot \begin{bmatrix} x \\ 0 \end{bmatrix} = \lambda_1 \cdot \begin{bmatrix} x \\ 0 \end{bmatrix}$$

and $$\begin{bmatrix} \lambda_1 & 0 \\ 0 & \lambda_2 \end{bmatrix} \cdot \begin{bmatrix} 0 \\ y \end{bmatrix} = \lambda_2 \cdot \begin{bmatrix} 0 \\ y \end{bmatrix}.$$

In this event, a transmission signal vector can be searched independently on an element-by-element basis, and assuming $$(s - \hat{s}) = \begin{bmatrix} x \\ y \end{bmatrix},$$

since an optimal search area is inversely proportional to the square root of the eigenvalue from the aforementioned description, the following relationship is established for the first eigenvalue and eigenvector, i.e., x:

$$\text{search area of } x \propto \frac{c}{\sqrt{\lambda_1}} \cdot e_1,$$

and the following relationship is established for the second eigenvalue and eigenvector, i.e., y:

$$\text{search area of } y \propto \frac{c}{\sqrt{\lambda_2}} \cdot e_2.$$

Figure 3:
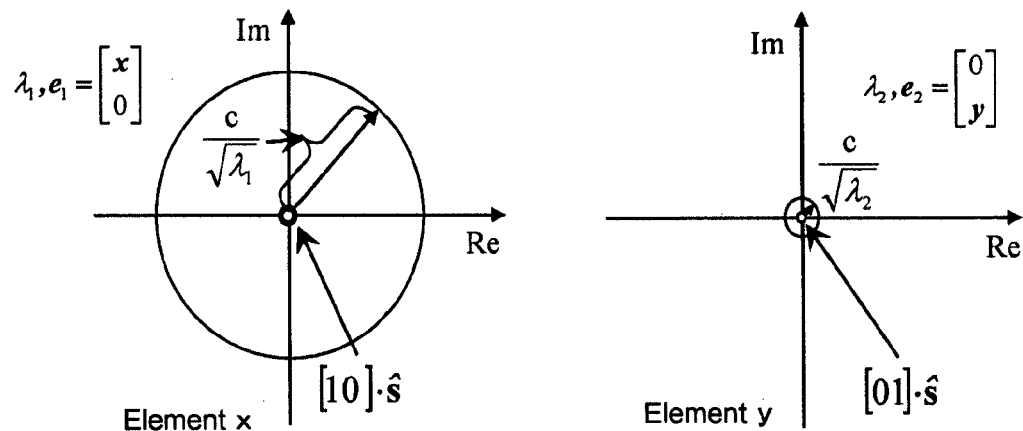
FIG. 3. is a diagram showing an exemplary search area limiting process with eigenvalues and eigenvectors shown in the case of two-dimensional complex numbers, showing a case where the eigenvector has one element.

This relationship is shown in FIG. 3. In FIG. 3, Re designates the real axis, and Im designates the imaginary axis. Since FIG. 3 is drawn on the assumption that $\lambda_1 < \lambda_2$ is established, a search area for element x is larger than a search area for element y. While a signal point corresponding to first element x of a two-dimensionally modulated transmission signal vector is searched on this complex plane, it is understood that the search area for element y is reduced, so that a search is efficiently made with low complexity. In regard to second element y of the two-dimensionally modulated transmission signal vector, a signal point may be searched on a complex plane which is this small search area.

Next, a description will be given of a scenario where a search area is limited with elements in a channel matrix being related to one another, i.e., where a plurality of element components of eigenvalue vectors exist, unlike each of the aforementioned examples, based on a specific exemplary embodiment. This exemplary embodiment reduces the circuit scale by simplifying a mechanism for determining a search area of the eigenvectors by performing weighting so as to be inversely proportional to the square root of each eigenvalue using a vector for a minimum eigenvalue and using scalar for other eigenvalues. The following description will be given in connection with two-dimensional channel matrix H in consideration of ease of explanation.

Assuming $$H = \begin{bmatrix} 1 & \exp[j\theta_1] \\ \exp[-j(\theta_1+\varphi)] & 1 \end{bmatrix} \text{ where; } \lambda_1 < \lambda_2, \quad (28)$$

from $\Omega = H^H \cdot H$, the following is derived:

$$\Omega = \begin{bmatrix} 1 & \exp[j\theta_1] \\ \exp[-j(\theta_1+\varphi)] & 1 \end{bmatrix} \cdot \begin{bmatrix} 1 & \exp[j(\theta_1+\varphi)] \\ \exp[-j\theta_1] & 1 \end{bmatrix} \quad (29)$$

$$= \begin{bmatrix} 2 & \exp[j\theta_1] \cdot (1+\exp[j\varphi]) \\ \exp[-j\theta_1] \cdot (1+\exp[-j\varphi]) & 2 \end{bmatrix}.$$

This eigenvalue is found in the following manner.
From the following relationship $$\begin{vmatrix} 2-\lambda & \exp[j\theta_1] \cdot (1+\exp[j\varphi]) \\ \exp[-j\theta_1] \cdot (1+\exp[-j\varphi]) & 2-\lambda \end{vmatrix} = 0, \quad (30)$$

the following is derived:

$$(\lambda-2)^2 - (1+\exp[j\phi]) \cdot (1+\exp[-j\phi]) = \lambda^2 + 4\lambda + 2 - \exp[j\phi] - \exp[-j\phi] = 0 \quad (31).$$

Solving this for $\lambda$, then $\lambda_1, \lambda_2$ are found in the following manner:

$$\lambda = 2 \pm \sqrt{2 + \exp[j\phi] + \exp[-j\phi]} = 2 \pm \sqrt{2 + 2\cos\phi} \quad (32).$$

Figure 4:
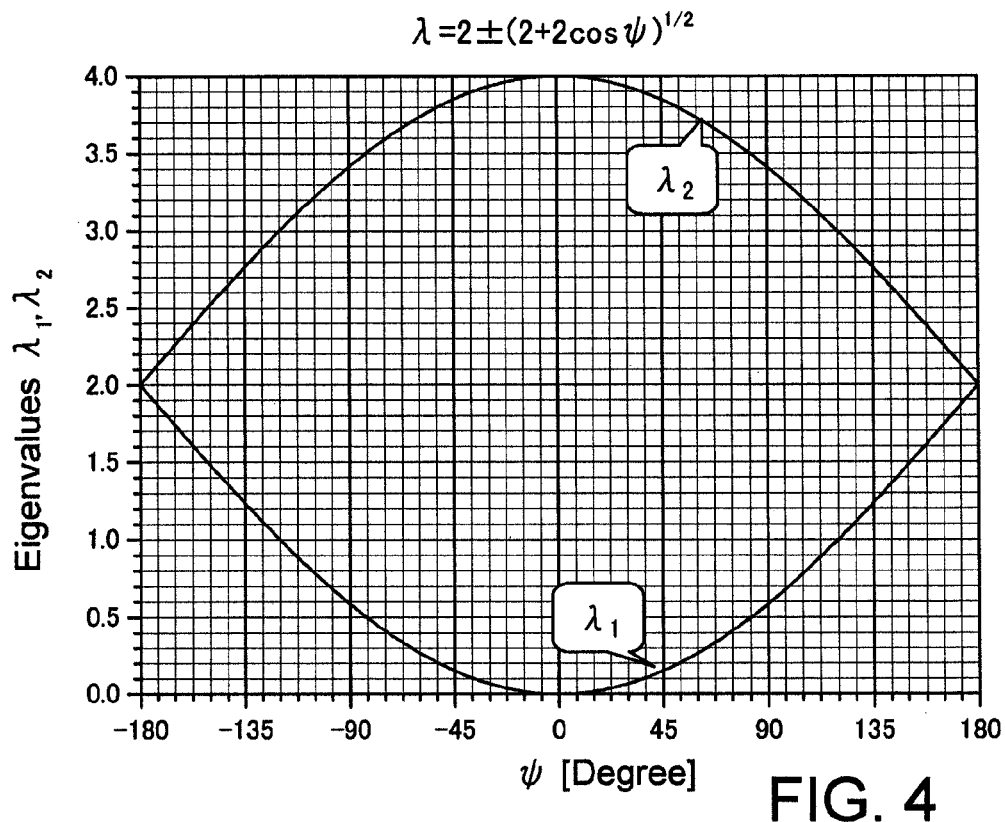
FIG. 4 is a diagram showing exemplary eigenvalues in accordance with a channel matrix.

FIG. 4 shows the relationship between $\phi$ and $\lambda_1, \lambda_2$ when $\phi$ is changed from +180 degrees to −180 degrees. As can be understood from FIG. 4, a condition in which the difference between $\lambda_1, \lambda_2$ increases exists in a small region of $\phi$.

From the following relationship $$\begin{bmatrix} 2-\lambda & \exp[j\theta_1] \cdot (1+\exp[j\varphi]) \\ \exp[-j\theta_1] \cdot (1+\exp[-j\varphi]) & 2-\lambda \end{bmatrix} \cdot \begin{bmatrix} x \\ y \end{bmatrix} = 0, \quad (33)$$

the eigenvector $$\begin{bmatrix} x \\ y \end{bmatrix}$$

for this eigenvalue $\lambda$ is calculated using Equation (32) as follows:

$$\begin{cases} x = e^{j\theta_1} \cdot \frac{(1+e^{j\varphi})}{2-\lambda} \cdot y \\ \quad = e^{j\theta_1} \cdot \frac{(1+e^{j\varphi})}{\mp\sqrt{2+2\cos\varphi}} \cdot y \\ \quad = e^{j\theta_1} \cdot \frac{e^{j\frac{\varphi}{2}} \cdot (e^{-j\frac{\varphi}{2}} + e^{j\frac{\varphi}{2}})}{\mp\sqrt{(1+e^{j\varphi})\cdot(1+e^{-j\varphi})}} \cdot y \\ \quad = e^{j\theta_1} \cdot \frac{e^{j\frac{\varphi}{2}} \cdot (e^{-j\frac{\varphi}{2}} + e^{j\frac{\varphi}{2}})}{\sqrt{e^{j\frac{\varphi}{2}} \cdot (e^{-j\frac{\varphi}{2}} + e^{j\frac{\varphi}{2}}) \cdot e^{-j\frac{\varphi}{2}} \cdot (e^{j\frac{\varphi}{2}} + e^{-j\frac{\varphi}{2}})}} \cdot y \\ \quad = \mp e^{j(\theta_1+\frac{\varphi}{2})} \\ x = e^{j\theta_1} \cdot \frac{2-\lambda}{(1+e^{-j\varphi})} \cdot y \\ \quad = e^{j\theta_1} \cdot \frac{\mp\sqrt{2+2\cos\varphi}}{(1+e^{-j\varphi})} \cdot y \\ \quad = e^{j\theta_1} \cdot \frac{\mp\sqrt{(1+e^{j\varphi})\cdot(1+e^{-j\varphi})}}{e^{-j\frac{\varphi}{2}} \cdot (e^{j\frac{\varphi}{2}} + e^{-j\frac{\varphi}{2}})} \cdot y \\ \quad = e^{j\theta_1} \cdot \frac{\mp\sqrt{e^{j\frac{\varphi}{2}} \cdot (e^{-j\frac{\varphi}{2}} + e^{j\frac{\varphi}{2}}) \cdot e^{-j\frac{\varphi}{2}} \cdot (e^{j\frac{\varphi}{2}} + e^{-j\frac{\varphi}{2}})}}{e^{-j\frac{\varphi}{2}} \cdot (e^{j\frac{\varphi}{2}} + e^{-j\frac{\varphi}{2}})} \cdot y \\ \quad = \mp e^{j(\theta_1+\frac{\varphi}{2})}. \end{cases} \quad (34)$$

Therefore,
First eigenvalue and eigenvector;

$$\lambda_1 = 2 - \sqrt{2 + 2\cdot\cos\varphi}, \quad e_1 = \begin{bmatrix} \frac{1}{\sqrt{2}} \\ \frac{1}{\sqrt{2}} \exp[j(\theta_1+\frac{\varphi}{2})] \end{bmatrix},$$

Second eigenvalue and eigenvector;

$$\lambda_2 = 2 + \sqrt{2 + 2 \cdot \cos\varphi}, \; e_2 = \begin{bmatrix} \frac{1}{\sqrt{2}} \\ -\frac{1}{\sqrt{2}} \exp[j(\theta_1 + \frac{\varphi}{2})] \end{bmatrix}$$

can be found. An optimal search area of a transmission signal vector is an ellipse defined by the axes to which the eigenvectors are weighted in inverse proportion to the square roots of the eigenvalues. Therefore, assuming:

$$t_1 = (s - \hat{s})^H \cdot \begin{bmatrix} \frac{1}{\sqrt{2}} \\ \frac{1}{\sqrt{2}} \exp[j(\theta_1 + \frac{\varphi}{2})] \end{bmatrix}, \quad (35)$$

$$t_2 = (s - \hat{s})^H \cdot \begin{bmatrix} \frac{1}{\sqrt{2}} \\ -\frac{1}{\sqrt{2}} \exp[j(\theta_1 + \frac{\varphi}{2})] \end{bmatrix}$$

for transmission signal vector s which satisfies $(s-\hat{s})^H \cdot \Omega \cdot (s-\hat{s}) = c^2$ for arbitrary c, it is understood that a search area may be specified in an ellipse determined by:

$$1 = \frac{|t_1|^2}{\left(\frac{c}{\sqrt{\lambda_1}}\right)^2} + \frac{|t_2|^2}{\left(\frac{c}{\sqrt{\lambda_2}}\right)^2}. \quad (36)$$

However, a description is herein given of an exemplary embodiment which is implemented with further simplification and low complexity. Specifically, this is a method of reducing the circuit scale for the search area limiting process by weighting in inverse proportion to the square root of each eigenvalue using a vector for a minimum eigenvalue which exerts the largest influence, and using a scalar for other eigenvalues.

When an observation point within a search area is represented along axes which are the aforementioned eigenvectors $e_1$, $e_2$ orthogonal to each other:

$$(s - \hat{s}) = \alpha \cdot e_1 + \beta \cdot e_2 \quad (37)$$

$$= \alpha \cdot \begin{bmatrix} \frac{1}{\sqrt{2}} \\ \frac{1}{\sqrt{2}} \exp[j(\theta_1 + \frac{\varphi}{2})] \end{bmatrix} +$$

$$\beta \cdot \begin{bmatrix} \frac{1}{\sqrt{2}} \\ -\frac{1}{\sqrt{2}} \exp[j(\theta_1 + \frac{\varphi}{2})] \end{bmatrix}.$$

$\alpha$ can be found in the following manner by multiplying both sides of Equation (37) by $e_1^H$ from the left, and $\beta$ can be found by multiplying both sides of Equation (37) by $e_2^H$ from the left:

$$\alpha = e_1^H \cdot (s - \hat{s}) \quad (38)$$

$$= \begin{bmatrix} \frac{1}{\sqrt{2}} \\ \frac{1}{\sqrt{2}} \exp[j(\theta_1 + \frac{\varphi}{2})] \end{bmatrix}^H \cdot (s - \hat{s}),$$

$$\beta = e_2^H \cdot (s - \hat{s})$$

$$= \begin{bmatrix} \frac{1}{\sqrt{2}} \\ -\frac{1}{\sqrt{2}} \exp[j(\theta_1 + \frac{\varphi}{2})] \end{bmatrix}^H \cdot (s - \hat{s}).$$

Since they are comparable to the aforementioned $t_1$, $t_2$ (essentially the same though they are complex conjugates), they define the same elliptic search area similar to the aforementioned.

Thus, when the foregoing relationship is expressed in a different manner using a complex variable limited within a unit circle on the complex plane $\{a; |a| \leq |e^{j\theta_a}|\}$, $\{b; |b| = |e^{j\theta_b}|\}$, the following equation is derived:

$$(s - \hat{s}) = a \cdot \left(\frac{c}{\sqrt{\lambda_1}}\right) \cdot e_1 + b \cdot \left(\frac{c}{\sqrt{\lambda_1}}\right) \cdot e_2 \quad (39)$$

$$= a \cdot \left(\frac{c}{\sqrt{\lambda_1}}\right) \cdot \begin{bmatrix} \frac{1}{\sqrt{2}} \\ \frac{1}{\sqrt{2}} \exp[j(\theta_1 + \frac{\varphi}{2})] \end{bmatrix} +$$

$$b \cdot \left(\frac{c}{\sqrt{\lambda_1}}\right) \cdot \begin{bmatrix} \frac{1}{\sqrt{2}} \\ -\frac{1}{\sqrt{2}} \exp[j(\theta_1 + \frac{\varphi}{2})] \end{bmatrix}$$

where; $\lambda_1 < \lambda_2$.

Here, since Equation (39) is a configuration by an arbitrary combination using a plurality of vectors, a search area limiting processing unit which processes Equation (39) is increased in complexity. Thus, considering a reduction in complexity on the assumption that the second term of the right side of Equation (39), which has less contribution to the result of the search area limiting process, is scalarized, the following equation is derived:

$$(s - \hat{s}) = a \cdot \left(\frac{c}{\sqrt{\lambda_1}}\right) \cdot e_1 + b \cdot \left(\frac{c}{\sqrt{\lambda_2}}\right) \cdot \begin{bmatrix} \frac{1}{\sqrt{2}} \\ \frac{1}{\sqrt{2}} \end{bmatrix} \quad (40)$$

$$= a \cdot \left(\frac{c}{\sqrt{\lambda_1}}\right) \cdot \begin{bmatrix} \frac{1}{\sqrt{2}} \\ \frac{1}{\sqrt{2}} \exp[j(\theta_1 + \frac{\varphi}{2})] \end{bmatrix} +$$

$$b \cdot \left(\frac{c}{\sqrt{\lambda_2}}\right) \cdot \begin{bmatrix} \frac{1}{\sqrt{2}} \\ \frac{1}{\sqrt{2}} \end{bmatrix}$$

where; $\lambda_1 < \lambda_2$.

Therefore: the following equation is derived:

$$(s-\hat{s}) = \begin{bmatrix} x \\ y \end{bmatrix} \quad (41)$$

$$= \begin{bmatrix} \frac{c}{\sqrt{2}}\left\{ a\cdot\left(\frac{1}{\sqrt{\lambda_1}}\right) + b\cdot\left(\frac{1}{\sqrt{\lambda_2}}\right)\right\} \\ \frac{c}{\sqrt{2}}\left\{ a\cdot\left(\frac{1}{\sqrt{\lambda_1}}\right)\exp[j(\theta_1+\frac{\varphi}{2})] + b\cdot\left(\frac{1}{\sqrt{\lambda_2}}\right)\right\} \end{bmatrix}$$

where; $\lambda_1 < \lambda_2$.

Figure 5:
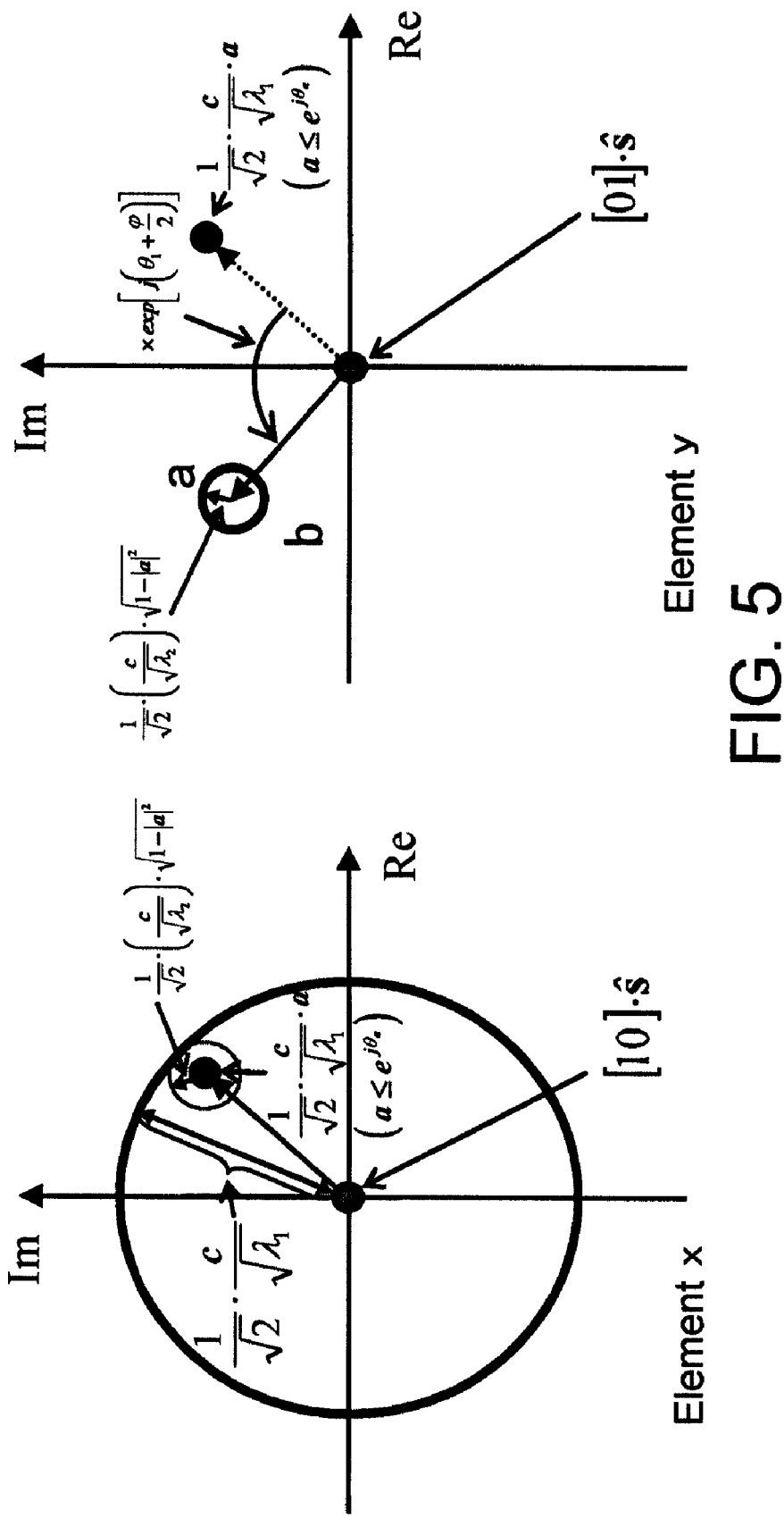
FIG. 5 is a diagram showing an exemplary search area limiting process with eigenvalues and eigenvector shown in the case of two-dimensional complex numbers, showing a case where a plurality of elements of the eigenvector exist.

When this result is viewed in a state of $\phi=36$ degrees of the channel matrix, $\lambda_1=0.1$, and $\lambda_2=3.9$ as shown by FIG. 4. Therefore, a search area for elements x of a signal vector $$(s-\hat{s}) = \begin{bmatrix} x \\ y \end{bmatrix}$$

for search is a circular area having a radius of $$\frac{1}{\sqrt{2}}\cdot\frac{c}{\sqrt{\lambda_1}},$$

where most of elements x are components determined by $\lambda_1=0.1$, as shown by elements x in FIG. 5. And, the search area for elements x is determined by slightly adding $$\frac{1}{\sqrt{2}}\cdot\frac{c}{\sqrt{\lambda_2}}$$

which is a scalar component. In this event, element y is also searched in association with element x. Assuming that a search point of elements on the complex plane is $$\frac{1}{\sqrt{2}}\cdot\frac{c}{\sqrt{\lambda_1}}\cdot a;$$

where $\alpha=e^{j\theta_\alpha}$, the search of y performed in association involves an omni-directional search over centered at $$\frac{1}{\sqrt{2}}\cdot\frac{c}{\sqrt{\lambda_1}}\cdot a\cdot\exp[j(\theta_1+\frac{\varphi}{2})]$$

with a radius of $$\frac{1}{\sqrt{2}}\cdot\left(\frac{c}{\sqrt{\lambda_2}}\right),$$

or more strictly, $$\frac{1}{\sqrt{2}}\cdot\left(\frac{c}{\sqrt{\lambda_2}}\right)\cdot\sqrt{1-|a|^2}.$$

($\because$ from Equation (36), $$1 = \frac{\left|\frac{c}{\sqrt{\lambda_1}}a\right|^2}{\left(\frac{c}{\sqrt{\lambda_1}}\right)^2} + \frac{\left|\frac{c}{\sqrt{\lambda_2}}b\right|^2}{\left(\frac{c}{\sqrt{\lambda_2}}\right)^2} = |a|^2 + |b|^2 \therefore |b| = \sqrt{1-|a|^2}.)$$

The area showing element y in FIG. 5 is a search area at that time.

From FIG. 5, it is understood that the search area of element y becomes a largely narrowed area with a radius of $$\frac{1}{\sqrt{2}}\cdot\left(\frac{c}{\sqrt{\lambda_2}}\right)$$

in association with element x. Even though the search area is limited to the thus narrowed area, areas which satisfy $(s-\hat{s})^H\cdot\Omega\cdot(s-\hat{s})\leq c^2$ are fully covered.

In this exemplary embodiment, the search area is set by treating only an eigenvector corresponding to a minimum eigenvalue as a vector, and causing other eigenvalues to contribute to the search area in scalar value, thereby reducing the processing scale. Further, such a treatment of the vector, each element of the vector maintains a relationship as a vector, while a search area of each element is given a margin in such a form that scalar values for other eigenvalues are inversely proportional to the square root of each eigenvalue, thereby enabling the realization with a lower complexity.

Next, a description will be given of a method of calculating eigenvalues $\lambda_1, \lambda_2, \ldots, \lambda_n$ and eigenvectors $e_1, e_2, \ldots, e_n$ corresponding thereto from $\Omega$ through Jacobean rotation, performed in eigenvalue/eigenvector calculation unit 103 of the MIMO decoder illustrated in FIG. 2. Specifically, a description will be given of an exemplary embodiment of the MIMO decoder which comprises an eigenvalue/eigenvector calculation unit which implements this Jacobean rotation with low complexity and at high speeds. Characteristic portions different from other exemplary embodiments are described in detail.

This exemplary embodiment is characterized in that when the Jacobean rotation is implemented in the eigenvalue/eigenvector calculation unit, a rotating angle is resolved as a signed sum of a plurality of arctangents (arctan or $\tan^{-1}$) for 2's negative power, and the Jacobean rotation is implemented using a rotation matrix which has elements that are linear sums of 2's negative powers configured based on the polarities derived when the rotating angle is resolved in this way. Before describing the configuration of this exemplary embodiment, a description will be first given of a process of deriving eigenvalues and eigenvectors through the Jacobean rotation.

$Q=H^H\cdot H$ is applied to the eigenvalue/eigenvector calculation unit as input. The Jacobean rotation refers to processing for generating eigenvalue $\lambda$ which is a scalar value and X which is an eigenvector, that satisfy:

$$\Omega\cdot X = \lambda\cdot X \quad (42)$$

for this $\Omega$.

When both sides of Equation (42) is multiplied by nonsingular matrix M from the left, the following equation is derived:

$$M\cdot\Omega\cdot X = \lambda\cdot M\cdot X \quad (43).$$

Here, $X=M^{-1}\cdot y$ when $y=M\cdot X$, so that the following equation is derived:

$$M\cdot\Omega\cdot M^{-1}\cdot y = \lambda\cdot y \quad (44).$$

In other words, this shows that the eigenvalue or eigenvector does not change even if $\Omega$ is replaced with $\Omega\cdot M^{-1}$. Consider that this transformation is repeated several times for transform into a simple form. Now, consider following elements as this nonsingular matrix M:

$$m_{ij} = \begin{cases} \cos\theta & (\text{at } i = j = p, i = j = q) \\ \sin\theta & (\text{at } i = p, j = q) \\ -\sin\theta & (\text{at } i = q, j = p) \\ 0 & (\text{at others } i \neq j) \\ 1 & (\text{at others } i = j), \end{cases} \quad (45)$$

where p, q are row numbers. How to determine angle θ will be described later. When M is delineated, the following equation is derived:

$$M = \begin{bmatrix} 1 \\ & \ddots \\ & & 1 \\ & & & \cos\theta & & & \sin\theta \\ & & & & 1 \\ & & & & & \ddots \\ & & & & & & 1 \\ & & & -\sin\theta & & & \cos\theta \\ & & & & & & & & 1 \\ & & & & & & & & & \ddots \\ & & & & & & & & & & 1 \end{bmatrix} \begin{matrix} \\ \\ \\ \Leftarrow p\text{-}th \text{ raw} \\ \\ \\ \\ \Leftarrow q\text{-}th \text{ raw.} \end{matrix}$$

$$\underset{p\text{-}th \text{ column}}{\Uparrow} \quad \underset{q\text{-}th \text{ column}}{\Uparrow}$$

Matrix M has the following nature, as will be understood from actual calculations:

$$M \cdot M^H = \begin{bmatrix} 1 \\ & \ddots \\ & & \cos\theta & & \sin\theta \\ & & & 1 \\ & & & & \ddots \\ & & -\sin\theta & & \cos\theta \\ & & & & & 1 \\ & & & & & & \ddots \end{bmatrix} \quad (46)$$

$$\begin{bmatrix} 1 \\ & \ddots \\ & & \cos\theta & & -\sin\theta \\ & & & 1 \\ & & & & \ddots \\ & & \sin\theta & & \cos\theta \\ & & & & & 1 \\ & & & & & & \ddots \end{bmatrix} =$$

$$\begin{bmatrix} 1 \\ & \ddots \\ & & 1 & & 0 \\ & & & 1 \\ & & & & \ddots \\ & & 0 & & 1 \\ & & & & & 1 \\ & & & & & & \ddots \end{bmatrix} = I.$$

Specifically, $M \cdot M^H = I$, and $M^{-1} = M^H$, so that the inverse matrix in Equation (44) need not be purposely calculated, but a simple calculation is sufficient, as follows:

$$M \cdot \Omega = \begin{bmatrix} 1 \\ & \ddots \\ & & \cos\theta & & \sin\theta \\ & & & 1 \\ & & & & \ddots \\ & & -\sin\theta & & \cos\theta \\ & & & & & 1 \\ & & & & & & \ddots \end{bmatrix} \cdot \begin{bmatrix} \Omega_{11} & \cdots & \Omega_{1p} & \cdots & \cdots & \Omega_{1q} & \cdots & \Omega_{1n} \\ \vdots & \ddots & \vdots & & & \vdots & & \vdots \\ \Omega_{p1} & \cdots & \Omega_{pp} & \cdots & \cdots & \Omega_{pq} & \cdots & \Omega_{pn} \\ \vdots & & \vdots & \ddots & & \vdots & & \vdots \\ \vdots & & \vdots & & \ddots & \vdots & & \vdots \\ \Omega_{q1} & \cdots & \Omega_{qp} & \cdots & \cdots & \Omega_{qq} & \cdots & \Omega_{qn} \\ \vdots & & \vdots & & & \vdots & \ddots & \vdots \\ \Omega_{n1} & \cdots & \Omega_{np} & \cdots & \cdots & \Omega_{nq} & \cdots & \Omega_{nn} \end{bmatrix} = \quad (47)$$

$$\begin{bmatrix} \Omega_{11} & \cdots & \Omega_{1p} & \cdots & \cdots & \Omega_{1q} & \cdots & \Omega_{1n} \\ \vdots & \ddots & \vdots & & & \vdots & & \vdots \\ \Omega_{p1}\cos\theta + & & \Omega_{pp}\cos\theta + & & & \Omega_{pq}\cos\theta + & & \Omega_{pn}\cos\theta + \\ \Omega_{q1}\sin\theta & \cdots & \Omega_{qp}\sin\theta & \cdots & \cdots & \Omega_{qq}\sin\theta & \cdots & \Omega_{qn}\sin\theta \\ \Omega_{p+1,1} & & \Omega_{p+1,p} & \ddots & & \Omega_{p+1,q} & & \Omega_{p+1,n} \\ \vdots & & \vdots & & \ddots & \vdots & & \vdots \\ -\Omega_{p1}\sin\theta + & & -\Omega_{pp}\sin\theta + & & & -\Omega_{pq}\sin\theta + & & -\Omega_{pn}\sin\theta + \\ \Omega_{q1}\cos\theta & \cdots & \Omega_{qp}\cos\theta & \cdots & \cdots & \Omega_{qq}\cos\theta & \cdots & \Omega_{qn}\cos\theta \\ \vdots & & \vdots & & & \vdots & \ddots & \vdots \\ \Omega_{n1} & \cdots & \Omega_{np} & \cdots & \cdots & \Omega_{nq} & \cdots & \Omega_{nn} \end{bmatrix}.$$

Further, Equation (47) is multiplied by $M^{-1}=M^H$ from the right to derive the following equation:

$$(M \cdot \Omega) \cdot M^{-1} = \begin{bmatrix} \Omega_{11} & \cdots & \Omega_{1p} & \cdots & \cdots & \Omega_{1q} & \cdots & \Omega_{1n} \\ \vdots & \ddots & \vdots & & & \vdots & & \vdots \\ \Omega_{p1}\cos\theta + \Omega_{q1}\sin\theta & \cdots & \Omega_{pp}\cos\theta + \Omega_{qp}\sin\theta & \cdots & \cdots & \Omega_{pq}\cos\theta + \Omega_{qq}\sin\theta & \cdots & \Omega_{pn}\cos\theta + \Omega_{qn}\sin\theta \\ \Omega_{p+1,1} & \cdots & \Omega_{p+1,p} & \ddots & & \Omega_{p+1,q} & & \Omega_{p+1,n} \\ \vdots & & \vdots & & \ddots & \vdots & & \vdots \\ -\Omega_{p1}\sin\theta + \Omega_{q1}\cos\theta & \cdots & -\Omega_{pp}\sin\theta + \Omega_{qp}\cos\theta & \cdots & \cdots & -\Omega_{pq}\sin\theta + \Omega_{qq}\cos\theta & \cdots & -\Omega_{pn}\sin\theta + \Omega_{qn}\cos\theta \\ \vdots & & \vdots & & & \vdots & \ddots & \vdots \\ \Omega_{n1} & \cdots & \Omega_{np} & \cdots & \cdots & \Omega_{nq} & \cdots & \Omega_{nn} \end{bmatrix} \times \begin{bmatrix} 1 & & & & & & \\ & \ddots & & & & & \\ & & \cos\theta & & -\sin\theta & & \\ & & & 1 & & & \\ & & & & \ddots & & \\ & & \sin\theta & & \cos\theta & & \\ & & & & & 1 & \\ & & & & & & \ddots \end{bmatrix} =$$

$$\begin{bmatrix} \Omega_{11} & \cdots & \Omega_{1p}\cos\theta + \Omega_{1q}\sin\theta & \Omega_{1,p+1} & \cdots & -\Omega_{1p}\sin\theta + \Omega_{1q}\cos\theta & \Omega_{1,q+1} & \cdots & \Omega_{1n} \\ \vdots & & \vdots & \vdots & & \vdots & \vdots & & \vdots \\ \Omega_{p1}\cos\theta + \Omega_{q1}\sin\theta & \cdots & \Omega_{pp}\cos^2\theta + \Omega_{qp}\sin\theta\cos\theta + \Omega_{pq}\cos\theta\sin\theta + \Omega_{qq}\sin^2\theta & \Omega_{p,p+1}\cos\theta + \Omega_{q,p+1}\sin\theta & \cdots & -\Omega_{pp}\cos\theta\sin\theta - \Omega_{qp}\sin^2\theta + \Omega_{pq}\cos^2\theta + \Omega_{qq}\sin\theta\cos\theta & \Omega_{p,q+1}\cos\theta + \Omega_{q,q+1}\sin\theta & \cdots & \Omega_{pn}\cos\theta + \Omega_{qn}\sin\theta \\ \Omega_{p+1,1} & \cdots & \Omega_{p+1,p}\cos\theta + \Omega_{p+1,q}\sin\theta & \Omega_{p+1,p+1} & \cdots & -\Omega_{p+1,p}\sin\theta + \Omega_{p+1,q}\cos\theta & \Omega_{p+1,q+1} & \cdots & \Omega_{n,q+1} \\ \vdots & & \vdots & \vdots & & \vdots & \vdots & & \vdots \\ -\Omega_{p1}\sin\theta + \Omega_{q1}\cos\theta & \cdots & -\Omega_{pp}\sin\theta\cos\theta + \Omega_{qp}\cos^2\theta - \Omega_{pq}\sin^2\theta + \Omega_{qq}\cos\theta\sin\theta & -\Omega_{p,p+1}\sin\theta + \Omega_{q,p+1}\cos\theta & \cdots & \Omega_{pp}\sin^2\theta - \Omega_{qp}\cos\theta\sin\theta - \Omega_{pq}\sin\theta\cos\theta + \Omega_{qq}\cos^2\theta & -\Omega_{p,q+1}\sin\theta + \Omega_{q,q+1}\cos\theta & \cdots & -\Omega_{pn}\sin\theta + \Omega_{qn}\cos\theta \\ \vdots & & \vdots & \vdots & & \vdots & \vdots & & \vdots \\ \Omega_{n,1} & \cdots & \Omega_{np}\cos\theta + \Omega_{nq}\sin\theta & \Omega_{n,p+1} & \cdots & -\Omega_{np}\sin\theta + \Omega_{nq}\cos\theta & \Omega_{n1,q+1} & \cdots & \Omega_{nn} \end{bmatrix}. \quad (48)$$

Substituting new$\Omega$ into the transformed matrix $M \cdot \Omega \cdot M^{-1}$, the following relationship is established:

$$\begin{cases} \text{new } \Omega_{ij} = \Omega_{ij}(i, j \neq p, q) \\ \text{new } \Omega_{pj} = \Omega_{pj}\cos\theta + \Omega_{qj}\sin\theta(j \neq p, q) \\ \text{new } \Omega_{qj} = -\Omega_{pj}\sin\theta + \Omega_{qj}\cos\theta(j \neq p, q) \\ \text{new } \Omega_{ip} = \Omega_{ip}\cos\theta + \Omega_{iq}\sin\theta(i \neq p, q) \\ \text{new } \Omega_{iq} = -\Omega_{iq}\sin\theta + \Omega_{iq}\cos\theta(i \neq p, q) \\ \text{new } \Omega_{pp} = \Omega_{pp}\cos^2\theta + \Omega_{qp}\sin\theta\cos\theta + \Omega_{pq}\cos\theta\sin\theta + \Omega_{qq}\sin^2\theta \\ \qquad = \Omega_{pp}\cos^2\theta + (\Omega_{pq} + \Omega_{qp})\sin\theta\cos\theta + \Omega_{qq}\sin^2\theta \\ \text{new } \Omega_{pq} = -\Omega_{pp}\cos\theta\sin\theta - \Omega_{qp}\sin^2\theta + \Omega_{pq}\cos^2\theta + \Omega_{qq}\sin\theta\cos\theta \\ \qquad = (\Omega_{qq} - \Omega_{pp})\sin\theta\cos\theta + \Omega_{pq}\cos^2\theta - \Omega_{qp}\sin^2\theta \\ \text{new } \Omega_{qp} = -\Omega_{pp}\sin\theta\cos\theta + \Omega_{qp}\cos^2\theta - \Omega_{pq}\sin^2\theta + \Omega_{qq}\cos\theta\sin\theta \\ \qquad = (\Omega_{qq} - \Omega_{pp})\sin\theta\cos\theta + \Omega_{qp}\cos^2\theta - \Omega_{pq}\sin^2\theta \\ \text{new } \Omega_{qq} = \Omega_{pp}\sin^2\theta - \Omega_{qp}\cos\theta\sin\theta - \Omega_{pq}\sin\theta\cos\theta + \Omega_{qq}\cos^2\theta \\ \qquad = \Omega_{pp}\sin^2\theta - (\Omega_{pq} + \Omega_{qp})\sin\theta\cos\theta + \Omega_{qq}\cos^2\theta. \end{cases} \quad (49)$$

Since this new matrix new$\Omega$ is also a Hermitian matrix, all diagonal elements are real numbers. However, non-diagonal elements may be complex numbers in some cases. In the Jacobean rotation, $\theta$ is determined such that new$\Omega_{pq}$, new$\Omega_{qp}$, which are arbitrary elements in all the non-diagonal elements, are "0." Since some non-diagonal elements are complex numbers, this exemplary embodiment employs a method which first converts target elements into real numbers and then performs the Jacobean rotation. Since $\Omega_{pq}$ and $\Omega_{qp}$ are used as targets, the following unitary matrix $M(-\omega_{pq})$ is used:

$$M(-\omega_{pq}) \cdot M(-\omega_{pq})^H = \begin{bmatrix} 1 & & & & & & & \\ & \ddots & & & & & & 0 \\ & & \exp[j\omega_{pq}] & & & & & \\ & & & 1 & & & & \\ & & & & \ddots & & & \\ & & & & & 1 & & \\ & & & & & & 1 & \\ 0 & & & & & & & \ddots \end{bmatrix}.$$

$$\Uparrow$$
$$p\text{-}th \text{ column}$$

$$\begin{bmatrix} 1 & & & & & & & \\ & \ddots & & & & & & 0 \\ & & \exp[-j\omega_{pq}] & & & & & \\ & & & 1 & & & & \\ & & & & \ddots & & & \\ & & & & & 1 & & \\ 0 & & & & & & 1 & \\ & & & & & & & \ddots \end{bmatrix} = \quad (50)$$

-continued $$\begin{bmatrix} 1 & & & & & & 0 \\ & \ddots & & & & & \\ & & 1 & & & & \\ & & & 1 & & & \\ & & & & \ddots & & \\ & & & & & 1 & \\ 0 & & & & & & 1 \\ & & & & & & & \ddots \end{bmatrix} = I$$

where $\Omega_{pq} = |\Omega_{pq}| \exp[j\omega_{pq}] = \Omega_{qp}^*$.

$\Omega$ after the transformation with $M(-\omega_{pq})$ is:

$$M(-\omega_{pq}) \cdot \Omega \cdot M(-\omega_{pq})^H = \begin{bmatrix} 1 & & & & & & 0 \\ & \ddots & & & & & \\ & & \exp[-j\omega_{pq}] & & & & \\ & & & 1 & & & \\ & & & & \ddots & & \\ & & & & & 1 & \\ 0 & & & & & & 1 \\ & & & & & & & \ddots \end{bmatrix} \quad (51)$$

$$\begin{bmatrix} \Omega_{11} & \cdots & * & \cdots & \cdots & * & \cdots & * \\ \vdots & \ddots & \vdots & & & \vdots & & \vdots \\ * & \cdots & \Omega_{pp} & \cdots & \cdots & \Omega_{pq} & \cdots & * \\ \vdots & & \vdots & \ddots & & \vdots & & \vdots \\ \vdots & & \vdots & & \ddots & \vdots & & \vdots \\ * & \cdots & \Omega_{qp} & \cdots & \cdots & \Omega_{qq} & \cdots & \vdots \\ \vdots & & \vdots & & & \vdots & \ddots & \vdots \\ * & \cdots & * & \cdots & \cdots & * & \cdots & \Omega_{nn} \end{bmatrix}.$$

$$\begin{bmatrix} 1 & & & & & & 0 \\ & \ddots & & & & & \\ & & \exp[j\omega_{pq}] & & & & \\ & & & 1 & & & \\ & & & & \ddots & & \\ & & & & & 1 & \\ 0 & & & & & & 1 \\ & & & & & & & \ddots \end{bmatrix} =$$

$$\begin{bmatrix} \Omega_{11} & \cdots & * & \cdots & \cdots & * & \cdots & * \\ \vdots & \ddots & \vdots & & & \vdots & & \vdots \\ * & \cdots & \Omega_{pp} & \cdots & \cdots & |\Omega_{pq}| & \cdots & * \\ \vdots & & \vdots & \ddots & & \vdots & & \vdots \\ \vdots & & \vdots & & \ddots & \vdots & & \vdots \\ * & \cdots & |\Omega_{qp}| & \cdots & \cdots & \Omega_{qq} & \cdots & \vdots \\ \vdots & & \vdots & & & \vdots & \ddots & \vdots \\ * & \cdots & * & \cdots & \cdots & * & \cdots & \Omega_{nn} \end{bmatrix}$$

where; $\Omega_{pq} = \Omega_{qp}^* \therefore |\Omega_{pq}| = |\Omega_{qp}|$.

Since this is also a Hermitian matrix, even a replacement does not cause a change in eigenvalues or eigenvectors, from the aforementioned relationship. Also, the diagonal elements remain unchanged, and both the values of targets $\Omega_{pq}$ and $\Omega_{qp}$ after the transformation become an equal real number. This transformed matrix is treated as $\Omega$. As such, the target element of new$\Omega$ derived by the transformation of Equation (48) from Equation (47) is represented by the following equation from Equation (49):

$$\text{new } \Omega_{pq} = \text{new } \Omega_{qp} \qquad (52)$$

$$= \frac{\Omega_{qq} - \Omega_{pp}}{2}\sin(2\theta) + |\Omega_{pq}| \cdot \cos(2\theta).$$

Since the Jacobean rotation determines $\theta$ such that this value becomes "0," the following equation is derived:

$$\frac{\sin(2\theta)}{\cos(2\theta)} = \frac{-|\Omega_{pq}|}{\frac{\Omega_{qq} - \Omega_{pp}}{2}} \qquad (53)$$

$$= \frac{2|\Omega_{pq}|}{\Omega_{pp} - \Omega_{qq}} \therefore \theta$$

$$= \frac{1}{2}\arctan\left(\frac{2|\Omega_{pq}|}{\Omega_{pp} - \Omega_{qq}}\right).$$

In this exemplary embodiment, a specific procedure of the Jacobean rotation using rotating angle $\theta$ repeats manipulations of designating non-diagonal elements of $\Omega$ which have the largest absolute values as the aforementioned targets $\Omega_{pq}$ and $\Omega_{qp}$, and determining $\theta$ such that new transformed new$\Omega_{pq}$ and new$\Omega_{qp}$ become "0" until the non-diagonal elements become sufficiently small. Consequently, the eigenvalues line up on diagonal elements of new new$\Omega$ after the transformation. This repeated process converges without fail. The convergence process will be described below.

Assuming now that a matrix of new new$\Omega$ after one transformation is B, the following equation is derived:

$$B^H \cdot B = (M \cdot \Omega \cdot M^{-1})^H \cdot (M \cdot \Omega \cdot M^{-1}) \qquad (54)$$

$$= (M \cdot \Omega \cdot M^H)^H \cdot (M \cdot \Omega \cdot M^H)$$

$$= (M \cdot \Omega^H \cdot M^H) \cdot (M \cdot \Omega \cdot M^H)$$

$$= M \cdot \Omega^H \cdot \Omega \cdot M^H$$

(where; $M^H = M^{-1}$).

As a relationship of trace of matrix, there is a relationship of $tr[A \cdot B] = tr[B \cdot A]$ for arbitrary square matrixes A, B, the following equation is established:

$$tr[B^H \cdot B] = tr[M \cdot \Omega^H \cdot \Omega \cdot M^H] = tr[M^H \cdot M \cdot \Omega^H \cdot \Omega] = tr[\Omega^H \cdot \Omega] \qquad (55).$$

Also, for arbitrary matrix A:

$$A^H \cdot A = \begin{bmatrix} a_{11}^* & \cdots & a_{n1}^* \\ \vdots & \ddots & \vdots \\ a_{1n}^* & \cdots & a_{nn}^* \end{bmatrix} \cdot \begin{bmatrix} a_{11} & \cdots & a_{1n} \\ \vdots & \ddots & \vdots \\ a_{n1} & \cdots & a_{nn} \end{bmatrix} \qquad (56)$$

-continued $$= \begin{bmatrix} \sum_{i=1}^{n} a_{i1}^* \cdot a_{i1} & \cdots & \sum_{i=1}^{n} a_{i1}^* \cdot a_{in} \\ \vdots & \ddots & \vdots \\ \sum_{i=1}^{n} a_{in}^* \cdot a_{i1} & \cdots & \sum_{i=1}^{n} a_{in}^* \cdot a_{in} \end{bmatrix}.$$

Therefore, since $$tr[B^H \cdot B] = \sum_{j=1}^{n} \sum_{i=1}^{n} |b_{ij}|^2, \quad (57)$$

$$tr[\Omega^T \cdot \Omega] = \sum_{j=1}^{n} \sum_{i=1}^{n} |\Omega_{ij}|^2,$$

the following result is derived:

$$\sum_{j=1}^{n} \sum_{i=1}^{n} |b_{ij}|^2 = \sum_{j=1}^{n} \sum_{i=1}^{n} |\Omega_{ij}|^2. \quad (58)$$

Equation (58) shows that a power sum of all elements of new new$\Omega$ after the transformation is the same as a power sum of all elements of the matrix before the transformation, and is held at a constant value. Using the relationships of Equation (49) and Equation (58), the following equations are derived:

$b_{ij} = \Omega_{ij}$ (i,j≠p,q)

$b_{pj} = \Omega_{pj} \cos\theta + \Omega_{qj} \sin\theta$ (j≠p,q)

$b_{qj} = -\Omega_{pj} \sin\theta + \Omega_{qj} \cos\theta$ (j≠p,q)

$b_{ip} = \Omega_{ip} \cos\theta + \Omega_{iq} \sin\theta$ (i≠p,q)

$b_{iq} = -\Omega_{ip} \sin\theta + \Omega_{iq} \cos\theta$ (i≠p,q)   (59).

Among these equations, the first equation has no change in any element and therefore has its power sum which remains unchanged. The next two equations become:

$$|b_{pj}|^2 + |b_{qj}|^2 = (\Omega_{pj}\cos\theta + \Omega_{qj}\sin\theta) \cdot (\Omega_{pj}^*\cos\theta + \Omega_{qj}^*\sin\theta) + \quad (60)$$
$$(-\Omega_{pj}\sin\theta + \Omega_{qj}\cos\theta) \cdot (-\Omega_{pj}^*\sin\theta + \Omega_{qj}^*\cos\theta)$$
$$= |\Omega_{pj}|^2 + |\Omega_{qj}|^2 \quad (j \neq p, q),$$

and their power sums remain unchanged. Likewise, the next two equations become:

$$|b_{ip}|^2 + |b_{iq}|^2 = (\Omega_{ip}\cos\theta + \Omega_{iq}\sin\theta) \cdot (\Omega_{ip}^*\cos\theta + \Omega_{iq}^*\sin\theta) + \quad (61)$$
$$(-\Omega_{ip}\sin\theta + \Omega_{iq}\cos\theta) \cdot (-\Omega_{ip}^*\sin\theta + \Omega_{iq}^*\cos\theta)$$
$$= |\Omega_{ip}|^2 + |\Omega_{iq}|^2 \quad (i \neq p, q),$$

and their power sums remain unchanged. Then, the remaining are:

$$b_{pp} = \Omega_{pp}\cos^2\theta + 2|\Omega_{pq}|\sin\theta\cos\theta + \Omega_{qq}\sin^2\theta \quad (62)$$
$$= \frac{\Omega_{pp} + \Omega_{qq}}{2} + \frac{\Omega_{pp} - \Omega_{qq}}{2}\cos(2\theta) + |\Omega_{pq}|\sin(2\theta)$$

$b_{pq} = \text{new } \Omega_{qp}$
$$= (\Omega_{qq} - \Omega_{pp})\sin\theta\cos\theta + |\Omega_{pq}|(\cos^2\theta - \sin^2\theta)$$
$$= \frac{\Omega_{qq} - \Omega_{pp}}{2}\sin(2\theta) + |\Omega_{pq}|\cos(2\theta)$$

$$b_{qq} = \Omega_{pp}\sin^2\theta - 2|\Omega_{pq}|\sin\theta\cos\theta + \Omega_{qq}\cos^2\theta$$
$$= \frac{\Omega_{pp} + \Omega_{qq}}{2} - \frac{\Omega_{pp} - \Omega_{qq}}{2}\cos(2\theta) - |\Omega_{pq}|\sin(2\theta),$$

and reviewing a combination of the following equations:

$$|b_{pp}|^2 + |b_{qq}|^2 + 2|b_{pq}|^2 = \quad (63)$$
$$\left(\left(\frac{\Omega_{pp}+\Omega_{qq}}{2}\right) + \left(\frac{\Omega_{pp}-\Omega_{qq}}{2}\cos(2\theta) + |\Omega_{pq}|\sin(2\theta)\right)\right)^2 +$$
$$\left(\left(\frac{\Omega_{pp}+\Omega_{qq}}{2}\right) - \left(\frac{\Omega_{pp}-\Omega_{qq}}{2}\cos(2\theta) + |\Omega_{pq}|\sin(2\theta)\right)\right)^2 +$$
$$2\left(\frac{\Omega_{qq}-\Omega_{pp}}{2}\sin(2\theta) + |\Omega_{pq}|\cos(2\theta)\right)^2$$
$$(\because \text{ all terms are real numbers}) =$$
$$2\left(\frac{\Omega_{pp}+\Omega_{qq}}{2}\right)^2 + 2\left(\frac{\Omega_{pp}-\Omega_{qq}}{2}\cos(2\theta) + |\Omega_{pq}|\sin(2\theta)\right)^2 +$$
$$2\left(\frac{\Omega_{pp}-\Omega_{qq}}{2}\sin(2\theta) + |\Omega_{pq}|\cos(2\theta)\right)^2 =$$
$$2\left(\frac{\Omega_{pp}+\Omega_{qq}}{2}\right)^2 + 2\left(\frac{\Omega_{pp}-\Omega_{qq}}{2}\right)^2 + 2|\Omega_{pq}|^2 =$$
$$\Omega_{pp}^2 + \Omega_{qq}^2 + 2|\Omega_{pq}|^2,$$

and $|b_{pp}|^2 + |b_{qq}|^2 + 2|b_{pq}|^2 = \Omega_{pp}^2 + \Omega_{qq}^2 + 2|\Omega_{pq}|^2$ is derived. As described above, since $\theta$ is selected such that $b_{pq}=0$, the following equation is derived after all:

$$|b_{pp}|^2 + |b_{qq}|^2 = \Omega_{pp}^2 + \Omega_{qq}^2 + 2|\Omega_{pq}|^2 \quad (64).$$

In other words, this transformation results in an increased power sum of the diagonal components. On the other hand, since the power sum of the elements of the entire matrix is held constant without change, as shown in the relationship of Equation (58), the power sum of the non-diagonal components decreases by this increase after all. Therefore, the power sum of the non-diagonal elements is expressed by $$\sum_{i \neq j} |b_{ij}|^2 = \sum_{i,j} |b_{ij}|^2 - \left(\sum_{i \neq p,q} |b_{ii}|^2 + |b_{pp}|^2 + |b_{qq}|^2\right) \quad (65)$$
$$= \sum_{i,j} |\Omega_{ij}|^2 - \left(\sum_{i \neq p,q} \Omega_{ii}^2 + \Omega_{pp}^2 + \Omega_{qq}^2 + 2|\Omega_{pq}|^2\right)$$
$$= \sum_{i \neq j} |\Omega_{ij}|^2 - 2|\Omega_{pq}|^2$$

from the aforementioned equation using a notation of $$\sum_{j=1}^{n}\sum_{i=1}^{n}|b_{ij}|^2 \equiv \sum_{i,j}|b_{ij}|^2.$$

In this equation, since p, q are selected to satisfy $$|\Omega_{pq}|^2 = \max_{i \neq j}|\Omega_{ij}|^2, \quad (66)$$

so that at least:

$$|\Omega_{pq}|^2 \geq \frac{1}{n^2-n} \cdot \sum_{i \neq j}|\Omega_{ij}|^2. \quad (67)$$

The power sum of the entire non-diagonal elements becomes:

$$\sum_{i \neq j}|b_{ij}|^2 \leq \left(1 - \frac{2}{n^2-n}\right) \cdot \sum_{i \neq j}|\Omega_{ij}|^2. \quad (68)$$

The non-diagonal elements are reduced as a whole through repetitions of such rotation and converge to "0."

Stated another way, manipulations of designating non-diagonal elements of Ω which have the largest absolute values as the aforementioned targets $\Omega_{pq}$ and $\Omega_{qp}$, and determining θ such that new transformed new$\Omega_{pq}$ and new$\Omega_{qp}$ become "0" are repeated until the non-diagonal elements become sufficiently small. In this repeated process, the eigenvalues line up on the diagonal elements of new matrix newΩ after the transformation. This repeated processing is represented by the following equation:

$$\ldots M(\theta_{p_2q_2}) \cdot M(-\omega_{p_2q_2}) \cdot \quad (69)$$
$$(M(\theta_{p_1q_1}) \cdot M(-\omega_{p_1q_1}) \cdot \Omega \cdot M(-\omega_{p_1q_1})^H \cdot M(\theta_{p_1q_1})^H) \cdot$$
$$M(-\omega_{p_2q_2})^H \cdot M(\theta_{p_2q_2})^H \ldots =$$

$$M \cdot \Omega \cdot M^H = \begin{bmatrix} \lambda_1 & & & 0 \\ & \ddots & & \\ & & \lambda_{min} & \\ 0 & & & \lambda_n \end{bmatrix} = \Lambda,$$

where M is:

$$\ldots M(\theta_{p_2q_2}) \cdot M(-\omega_{p_2q_2}) \cdot M(\theta_{p_1q_1}) \cdot M(-\omega_{p_1q_1}) = M \quad (70).$$

$M(-\omega_{p_iq_i})$ is represented by:

$$M(-\omega_{pq}) = \begin{bmatrix} 1 & & & & & 0 \\ & \ddots & & & & \\ & & \exp[-j\omega_{pq}] & & & \\ & & & 1 & & \\ & & & & \ddots & \\ & & & & & 1 \\ 0 & & & & & & \ddots \end{bmatrix} \quad (71)$$

from Equation (51) with the target represented by $$\Omega_{p_iq_i} = |\Omega_{p_iq_i}|\exp[j\omega_{p_iq_i}] = \Omega_{q_ip_i}^*.$$

$M(\theta_{pq})$ is represented by:

$$M(\theta_{p_iq_i}) = \begin{bmatrix} 1 & & & & & \\ & \ddots & & & & \\ & & \cos\theta_{p_iq_i} & & \sin\theta_{p_iq_i} & \\ & & & 1 & & \\ & & & & \ddots & \\ & & -\sin\theta_{p_iq_i} & & \cos\theta_{p_iq_i} & \\ & & & & & 1 \\ & & & & & & \ddots \end{bmatrix} \quad (72)$$

Also, from Equation (54):

$$\theta_{p_iq_i} = \frac{1}{2}\arctan\left(\frac{2|\Omega_{p_iq_i}|}{\Omega_{p_ip_i} - \Omega_{q_iq_i}}\right). \quad (73)$$

Next, a description will be given of the calculation of the eigenvectors. First, Equation (69) is rewritten for simplification in the following manner:

$$M_N \ldots M_2 \cdot M_1 \cdot \Omega \cdot M_1^H \cdot M_2^H \ldots M_N^H = \quad (74)$$

$$M \cdot \Omega \cdot M^H = \begin{bmatrix} \lambda_1 & & & 0 \\ & \ddots & & \\ & & \lambda_{min} & \\ 0 & & & \lambda_n \end{bmatrix} = \Lambda$$

where; $M_i = M(\theta_{p_iq_i}) \cdot M(-\omega_{p_iq_i})$.

For extracting eigenvector $e_{min}$ which gives minimum eigenvalue $\lambda_{min}$ from Equation (74), both sides of $M \cdot \Omega \cdot M^H = \Lambda$ in Equation (74) is multiplied by $M^H$ from the left. From Equation (46) and Equation (5), $M^H = M^{-1}$, $$\Omega \cdot M^H = M^H \cdot \begin{bmatrix} \lambda_1 & & & 0 \\ & \ddots & & \\ & & \lambda_{min} & \\ 0 & & & \lambda_n \end{bmatrix}$$

is derived. Here, assuming $M^H = [m_1 \ m_2 \ \ldots \ m_n]$, $$\Omega \cdot [m_1 \ m_2 \ \ldots \ m_n] = [m_1 \ m_2 \ \ldots \ m_n] \cdot \begin{bmatrix} \lambda_1 & & & 0 \\ & \ddots & & \\ & & \lambda_{min} & \\ 0 & & & \lambda_n \end{bmatrix} \quad (75)$$

$$= [\lambda_1 \cdot m_1 \ \lambda_2 \cdot m_2 \ \ldots \ \lambda_{min} \cdot m_m \ \lambda_n \cdot m_n].$$

Therefore, when eigenvalue vector mm for minimum eigenvalue $\lambda_{min}$ is selected from $\Omega \cdot m_i = \lambda_i \cdot m_i$ (where i=1, 2, . . . , n), this is an eigenvector for the minimum eigenvalue to be found. This applies to other eigenvectors. In other words, a column vector of $M^H$ is extracted. From Equation (74), $M^H = M_1^H \cdot M_2^H \cdot \ldots \cdot M_N^H$, which is sequentially calculated in parallel with the repeated processing of the Jacobean rotation in the manner of $M^H = (((((M_1^H) \cdot M_2^H) \cdot M_3^H) \cdot \ldots) \cdot M_{N-1}^H) \cdot M_N^H)$. Since this calculation can also be realized by a Jacobean rotation matrix which has elements that are linear sums of 2's negative powers, later described, with low complexity, the essence of this exemplary embodiment is a portion later described.

The foregoing description has been given of the process of finding eigenvalues and eigenvectors through the Jacobean rotation.

Next, a description will be given of an exemplary embodiment which is realized with low complexity by the Jacobean rotation matrix which has elements that are linear sums of 2's negative powers configured based on polarities which are found when this rotating angle is factorized as a signed sum of a plurality of arctangents for 2's negative power.

First, a description will be given of this exemplary embodiment which is realized with low complexity following the order of the processing with the Jacobean rotation.

As shown in Equation (48), only a p-th row and a q-th row are changed by the former processing of the Jacobean rotation. Also, components of the matrix to be transformed used therein are only the p-th row and q-th row. Therefore, the p-th row and p-th row are extracted as vectors and represented in the following manner:

$$\begin{bmatrix} \Omega'_p \\ \Omega'_q \end{bmatrix} = \begin{bmatrix} \Omega'_{p1} & \dots & \Omega'_{pp} & \dots & \dots & \Omega'_{pq} & \dots & \Omega'_{pn} \\ \Omega'_{q1} & \dots & \Omega'_{qp} & \dots & \dots & \Omega'_{qq} & \dots & \Omega'_{qn} \end{bmatrix} = \begin{bmatrix} \cos\theta & \sin\theta \\ -\sin\theta & \cos\theta \end{bmatrix} \cdot \begin{bmatrix} \Omega_{p1} & \dots & \Omega_{pp} & \dots & \dots & |\Omega_{pq}| & \dots & \Omega_{pn} \\ \Omega_{q1} & \dots & |\Omega_{qp}| & \dots & \dots & \Omega_{qq} & \dots & \Omega_{qn} \end{bmatrix} = \quad (76)$$

$$\begin{bmatrix} \Omega_{p1}\cos\theta + \Omega_{q1}\sin\theta & \dots & \Omega_{pp}\cos\theta + |\Omega_{qp}|\sin\theta & \dots & \dots & |\Omega_{pq}|\cos\theta + \Omega_{qq}\sin\theta & \dots & \Omega_{pn}\cos\theta + \Omega_{qn}\sin\theta \\ -\Omega_{p1}\sin\theta + \Omega_{q1}\cos\theta & \dots & -\Omega_{pp}\sin\theta + |\Omega_{qp}|\cos\theta & \dots & \dots & -|\Omega_{pq}|\sin\theta + \Omega_{qq}\cos\theta & \dots & -\Omega_{pn}\sin\theta + \Omega_{qn}\cos\theta \end{bmatrix}.$$

Here, the aforementioned 2×2 rotation matrix is designated by R(O), and is represented in the following manner:

$$R(\theta) = \begin{bmatrix} \cos\theta & \sin\theta \\ -\sin\theta & \cos\theta \end{bmatrix} \quad (77)$$

$$= \frac{1}{\left(\frac{1}{\cos\theta}\right)} \begin{bmatrix} 1 & \tan\theta \\ -\tan\theta & 1 \end{bmatrix}$$

$$= \frac{1}{\sqrt{\frac{\cos^2\theta + \sin^2\theta}{\cos^2\theta}}} \begin{bmatrix} 1 & \tan\theta \\ -\tan\theta & 1 \end{bmatrix}$$

$$= \frac{1}{\sqrt{1 + \tan^2\theta}} \begin{bmatrix} 1 & \tan\theta \\ -\tan\theta & 1 \end{bmatrix}$$

where;

$$-\frac{\pi}{2} < \theta < +\frac{\pi}{2}.$$

Also, the aforementioned θ is quantized with arctangent and represented in the following manner:

$$\theta = \sum_{k=0}^{\infty} s_k \cdot \theta_k \quad (78)$$

$$= \sum_{k=0}^{\infty} s_k \cdot \tan^{-1} 2^{-k}$$

$$= \sum_{k=0}^{\infty} \tan^{-1}(s_k \cdot 2^{-k})$$

where;

$$\tan\theta_k = 2^{-k}, s_k = \begin{cases} +1 \\ -1. \end{cases}$$

Since the rotation matrix is:

$$R(\theta_1) \cdot R(\theta_2) = \begin{bmatrix} \cos\theta_1 & \sin\theta_1 \\ -\sin\theta_1 & \cos\theta_1 \end{bmatrix} \cdot \begin{bmatrix} \cos\theta_2 & \sin\theta_2 \\ -\sin\theta_2 & \cos\theta_2 \end{bmatrix} \quad (79)$$

$$= \begin{bmatrix} \cos\theta_1\cos\theta_2 - \sin\theta_1\sin\theta_2 & \cos\theta_1\sin\theta_2 + \sin\theta_1\cos\theta_2 \\ -\sin\theta_1\cos\theta_2 - \cos\theta_1\sin\theta_2 & -\sin\theta_1\sin\theta_2 + \cos\theta_1\cos\theta_2 \end{bmatrix}$$

$$= \begin{bmatrix} \cos(\theta_1 + \theta_2) & \sin(\theta_1 + \theta_2) \\ -\sin(\theta_1 + \theta_2) & \cos(\theta_1 + \theta_2) \end{bmatrix}$$

$$= R(\theta_1 + \theta_2),$$

$$R(\theta) = R\left(\sum_{k=0}^{\infty} s_k \cdot \theta_k\right) \quad (80)$$

$$= \prod_{k=0}^{\infty} R(s_k \cdot \theta_k).$$

Therefore, the rotation matrix can be factorized in the following manner:

$$R(\theta) = \begin{bmatrix} \cos\theta & \sin\theta \\ -\sin\theta & \cos\theta \end{bmatrix} \quad (81)$$

$$= \prod_{k=0}^{\infty} \begin{bmatrix} \cos(s_k \cdot \theta_k) & \sin(s_k \cdot \theta_k) \\ -\sin(s_k \cdot \theta_k) & \cos(s_k \cdot \theta_k) \end{bmatrix}$$

$$= \prod_{k=0}^{\infty} \frac{1}{\sqrt{1 + \tan^2(s_k \cdot \theta_k)}} \begin{bmatrix} 1 & \tan(s_k \cdot \theta_k) \\ -\tan(s_k \cdot \theta_k) & 1 \end{bmatrix}$$

$$= \prod_{k=0}^{\infty} \frac{1}{\sqrt{1 + s_k^2 \cdot \tan^2\theta_k}} \begin{bmatrix} 1 & s_k \cdot \tan\theta_k \\ -s_k \cdot \tan\theta_k & 1 \end{bmatrix}$$

$$= \prod_{k=0}^{\infty} \frac{1}{\sqrt{1 + 2^{-2k}}} \begin{bmatrix} 1 & s_k \cdot 2^{-k} \\ -s_k \cdot 2^{-k} & 1 \end{bmatrix}$$

$$= \frac{1}{\alpha} \cdot \prod_{k=0}^{\infty} \begin{bmatrix} 1 & s_k \cdot 2^{-k} \\ -s_k \cdot 2^{-k} & 1 \end{bmatrix}$$

where;

$$\frac{1}{\alpha} = \prod_{k=0}^{\infty} \frac{1}{\sqrt{1 + 2^{-2k}}}.$$

In Equation (81), the bit accuracy is limited to K bits, and $$\prod_{k=0}^{K} \begin{bmatrix} 1 & s_k \cdot 2^{-k} \\ -s_k \cdot 2^{-k} & 1 \end{bmatrix}$$

is divided and collected for grouping in every plural number. In this exemplary embodiment, every two are collected into one group, but three or more may be collected in a similar manner. In the following, in an example in which two are collected into one group, $$\prod_{k=0}^{K} \begin{bmatrix} 1 & s_k \cdot 2^{-k} \\ -s_k \cdot 2^{-k} & 1 \end{bmatrix} = \prod_{k'=0}^{\frac{K}{2}} \begin{bmatrix} 1 & s_{2k'+1} \cdot 2^{-(2k'+1)} \\ -s_{2k'+1} \cdot 2^{-(2k'+1)} & 1 \end{bmatrix} \cdot \tag{82}$$

$$\begin{bmatrix} 1 & s_{2k'} \cdot 2^{-2k'} \\ -s_{2k'} \cdot 2^{-2k'} & 1 \end{bmatrix} =$$

$$\prod_{k'=0}^{\frac{K}{2}} \begin{bmatrix} 1 - s_{2k'} \cdot s_{2k'+1} \cdot 2^{-(4k'+1)} & (s_{2k'} + s_{2k'+1} \cdot 2^{-1}) \cdot 2^{-2k} \\ -(s_{2k'} + s_{2k'+1} \cdot 2^{-1}) \cdot 2^{-2k} & 1 - s_{2k'} \cdot s_{2k'+1} \cdot 2^{-(4k'+1)} \end{bmatrix} =$$

$$\prod_{k'=0}^{\frac{K}{2}} \begin{bmatrix} a_{k'} & b_{k'} \\ -b_{k'} & a_{k'} \end{bmatrix}.$$

When this is applied to Equation (76), the following equation is derived:

$$\begin{bmatrix} \Omega'_p \\ \Omega'_q \end{bmatrix} = \begin{bmatrix} \Omega'_{p1} & \cdots & \Omega'_{pp} & \cdots & \cdots & \Omega'_{pq} & \Omega'_{pn} \\ \Omega'_{q1} & \cdots & \Omega'_{qp} & \cdots & \cdots & \Omega'_{qq} & \Omega'_{qn} \end{bmatrix} = \tag{83}$$

$$\frac{1}{\alpha} \cdot \prod_{k'=0}^{\frac{K}{2}} \begin{bmatrix} a_{k'} & b_{k'} \\ -b_{k'} & a_{k'} \end{bmatrix} \cdot \begin{bmatrix} \Omega_p \\ \Omega_q \end{bmatrix} =$$

$$\frac{1}{\alpha} \cdot \prod_{k'=0}^{\frac{K}{2}} \begin{bmatrix} 1 - s_{2k'} \cdot s_{2k'+1} \cdot 2^{-(4k'+1)} & (s_{2k'} + s_{2k'+1} \cdot 2^{-1}) \cdot 2^{-2k'} \\ -(s_{2k'} + s_{2k'+1} \cdot 2^{-1}) \cdot 2^{-2k} & 1 - s_{2k'} \cdot s_{2k'+1} \cdot 2^{-(4k'+1)} \end{bmatrix} \cdot$$

$$\begin{bmatrix} \Omega_{p1} & \cdots & \Omega_{pp} & \cdots & |\Omega_{pq}| & \cdots & \Omega_{pn} \\ \Omega_{q1} & \cdots & |\Omega_{qp}| & \cdots & \cdots & \Omega_{qq} & \cdots & \Omega_{qn} \end{bmatrix} = \frac{1}{\alpha} \cdot$$

$$\left( \cdots \left( \begin{bmatrix} 1 - s_{2k'} \cdot s_{2k'+1} \cdot 2^{-5} & (s_{2k'} + s_{2k'+1} \cdot 2^{-1}) \cdot 2^{-2} \\ -(s_{2k'} + s_{2k'+1} \cdot 2^{-1}) \cdot 2^{-2} & 1 - s_{2k'} \cdot s_{2k'+1} \cdot 2^{-5} \end{bmatrix} \cdot \right.\right.$$
$$\left.\left. \left( \begin{bmatrix} 1 - s_{2k'} \cdot s_{2k'+1} \cdot 2^{-1} & (s_{2k'} + s_{2k'+1} \cdot 2^{-1}) \\ -(s_{2k'} + s_{2k'+1} \cdot 2^{-1}) & 1 - s_{2k'} \cdot s_{2k'+1} \cdot 2^{-1} \end{bmatrix} \cdots \begin{bmatrix} \Omega_p \\ \Omega_q \end{bmatrix} \right) \right) \right)$$

Sequential processing which should be essentially performed K times can be completed through repeated matrix processing K/2 times. In other words, a twice-higher speed can be accomplished. This is because the exemplary embodiment collects two by two for grouping for ease of explanation, and it should be understood that a four-times higher speed can be achieved when every four are collected for grouping.

Also, reviewing an arbitrary one processing among each grouped repeated processing, this is matrix operation which has elements that are linear sums of 2's negative powers configured based on a plurality of polarities ($S_{2k'}$, $S_{2k'+1}$ in this event). The linear sum of 2's negative power, when a hardware circuit is configured for finding the same, can be implemented only by a replacement unit (switch) of wires on a circuit and an adder, without the need for a multiplier, the circuit scale of which is generally large. Therefore, the processing can be performed at high speed using a circuit not complicated.

The foregoing is the former processing of the Jacobean rotation. Next, the latter processing will be described. As shown in Equation (48), only the p-th row, q-th row, p-th column and q-th column are changed by the latter processing of the Jacobean rotation. Also, before the Jacobean rotation is performed, processing for equating target elements $\Omega_{pq}$ and $\Omega_{qp}$ based on Equation (51) is performed by unitary matrix $M(-\omega_{pq})$. A resulting matrix is also a Hermitian matrix. Accordingly, as can be understood from Equation (48), all components on the p-th column and q-th column except for four diagonal elements are in a relationship of complex conjugate with components of the p-th row and q-th row. In other words, the result of the aforementioned calculation can be used as it is only by changing the sign in the imaginary part. The remaining four components can also be calculated at higher speed through the grouping in a similar manner to the above. When every two are collected for grouping in a manner similar to the aforementioned exemplary embodiment, it is performed in the following manner. First, the four element before the transformation is represented in matrix as follows:

$$\begin{bmatrix} \Omega'_{pp} & \Omega'_{pq} \\ \Omega'_{qp} & \Omega'_{qq} \end{bmatrix} = \begin{bmatrix} \Omega_{pp}\cos\theta + |\Omega_{qp}|\sin\theta & |\Omega_{pq}|\cos\theta + \Omega_{qq}\sin\theta \\ -\Omega_{pp}\sin\theta + |\Omega_{qp}|\cos\theta & -|\Omega_{pq}|\sin\theta + \Omega_{qq}\cos\theta \end{bmatrix}. \tag{84}$$

All elements of this matrix are real numbers. Accordingly, considering that the matrix after the transformation is also a Hermitian matrix, and is a symmetric matrix from the fact that it has real numbers for these four elements, the latter processing for the four remaining diagonal elements is represented by:

$$\begin{bmatrix} \Omega''_{pp} & \Omega''_{pq} \\ \Omega''_{qp} & \Omega''_{qq} \end{bmatrix} = \begin{bmatrix} \Omega'_{pp} & \Omega'_{pq} \\ \Omega'_{qp} & \Omega'_{qq} \end{bmatrix} \cdot \begin{bmatrix} \cos\theta & -\sin\theta \\ \sin\theta & \cos\theta \end{bmatrix} = \begin{bmatrix} \cos\theta & \sin\theta \\ -\sin\theta & \cos\theta \end{bmatrix} \cdot \begin{bmatrix} \Omega'_{pp} & \Omega'_{qp} \\ \Omega'_{pq} & \Omega'_{qq} \end{bmatrix} \tag{85}$$

$$\left( \because \begin{bmatrix} \Omega''_{pp} & \Omega''_{pq} \\ \Omega''_{qp} & \Omega''_{qq} \end{bmatrix} = \begin{bmatrix} \Omega''_{pp} & \Omega''_{pq} \\ \Omega''_{qp} & \Omega''_{qq} \end{bmatrix}^T \right) =$$

$$\frac{1}{\alpha} \cdot \prod_{k'=0}^{\frac{K}{2}} \begin{bmatrix} a_{k'} & b_{k'} \\ -b_{k'} & a_{k'} \end{bmatrix} \cdots \begin{bmatrix} \Omega'_{pp} & \Omega'_{qp} \\ \Omega'_{pq} & \Omega'_{qq} \end{bmatrix} = \frac{1}{\alpha} \cdot$$

-continued $$\prod_{k'=0}^{\frac{K}{2}} \begin{bmatrix} 1 - s_{2k'} \cdot s_{2k'+1} \cdot 2^{-(4k'+1)} & (s_{2k'} + s_{2k'+1} \cdot 2^{-1}) \cdot 2^{-2k'} \\ -(s_{2k'} + s_{2k'+1} \cdot 2^{-1}) \cdot 2^{-2k} & 1 - s_{2k'} \cdot s_{2k'+1} \cdot 2^{-(4k'+1)} \end{bmatrix} \cdot \begin{bmatrix} \Omega'_{pp} & \Omega'_{qp} \\ \Omega'_{pq} & \Omega'_{qq} \end{bmatrix} =$$

$$\frac{1}{\alpha} \cdot \left( \cdots \left( \begin{bmatrix} 1 - s_{2k'} \cdot s_{2k'+1} \cdot 2^{-5} & (s_{2k'} + s_{2k'+1} \cdot 2^{-1}) \cdot 2^{-2} \\ -(s_{2k'} + s_{2k'+1} \cdot 2^{-1}) \cdot 2^{-2} & 1 - s_{2k'} \cdot s_{2k'+1} \cdot 2^{-5} \end{bmatrix} \cdot \begin{bmatrix} 1 - s_{2k'} \cdot s_{2k'+1} \cdot 2^{-1} & (s_{2k'} + s_{2k'+1} \cdot 2^{-1}) \\ -(s_{2k'} + s_{2k'+1} \cdot 2^{-1}) & 1 - s_{2k'} \cdot s_{2k'+1} \cdot 2^{-1} \end{bmatrix} \cdot \begin{bmatrix} \Omega'_{pp} & \Omega'_{qp} \\ \Omega'_{pq} & \Omega'_{qq} \end{bmatrix} \right) \right).$$

Therefore, a twice higher speed can be accomplished as is the case with the above. Also, it should be understood that when every four are collected for grouping, a four-times higher speed can be accomplished. Since even one session of the processing involves matrix processing with elements which are linear sums of 2's negative powers configured based on a plurality of polarities ($S_{2k'}$, $S_{2k'+1}$ in this event), the hardware configuration can be implemented only by a replacement unit (switch) of wires on a circuit and an adder, making it possible to increase the speed with low complexity.

When a plurality of pieces are collected for grouping in this way, a plurality of polarities $S_k$ for each group must be collectively supplied. For example, in the example described above, two polarities $S_{2k'}$, $S_{2k+1}$ must be supplied at one time. From Equation (78), $$\theta = \sum_{k=0}^{K} s_k \cdot \theta_k \qquad (86)$$

$$= \sum_{k=0}^{K} s_k \cdot \tan^{-1} 2^{-k}$$

where;

$$\tan \theta_k = 2^{-k}, s_k = \begin{cases} +1 \\ -1, \end{cases}$$

so that:

$$\theta = \sum_{k'=0}^{\frac{K}{2}} (s_{2k'} \cdot \theta_{2k'} + s_{2k'+1} \cdot \theta_{2k'+1}) \qquad (87)$$

$$= \sum_{k'=0}^{\frac{K}{2}} \left( s_{2k} \cdot \tan^{-1} 2^{-2k'} + s_{2k'+1} \cdot \tan^{-1} 2^{-2k'+1} \right)$$

where;

$$\tan \theta_k = 2^{-k}, s_{2k'}, s_{2k'+1} = \begin{cases} +1, +1 \\ +1, -1 \\ -1, +1 \\ -1, -1. \end{cases}$$

Thus, θ can be quantized with arctangent by an update through sequential comparison of every four values.

Here, since this θ is set such that target elements become "0" from Equation (54), the following equation is derived:

$$\theta = \frac{1}{2} \tan^{-1} \left( \frac{2|\Omega_{pq}|}{\Omega_{pp} - \Omega_{qq}} \right). \qquad (88)$$

While the method calculates θ in accordance with Equation (88) and quantizes the same with arctangent in accordance with Equation (87), two exemplary embodiments will be described including a more direct way. Before that, a description will be given of a method of calculating θ in accordance with arctangent operation.

Consider the following vector manipulations using a rotation matrix in accordance with Equations (81), (82):

$$\begin{bmatrix} x \\ y(\Rightarrow 0) \end{bmatrix} = \begin{bmatrix} \cos \theta & \sin \theta \\ -\sin \theta & \cos \theta \end{bmatrix} \cdot \begin{bmatrix} 1 \\ t \end{bmatrix} = \qquad (89)$$

$$\prod_{k=0}^{K} \begin{bmatrix} \cos(s_k \cdot \theta_k) & \sin(s_k \cdot \theta_k) \\ -\sin(s_k \cdot \theta_k) & \cos(s_k \cdot \theta_k) \end{bmatrix} \cdot \begin{bmatrix} 1 \\ t \end{bmatrix} =$$

$$\frac{1}{\alpha} \prod_{k=0}^{K} \begin{bmatrix} 1 & s_k \cdot 2^{-k} \\ -s_k \cdot 2^{-k} & 1 \end{bmatrix} \cdot \begin{bmatrix} 1 \\ t \end{bmatrix} = \frac{1}{\alpha}$$

$$\prod_{k'=0}^{\frac{K}{2}} \begin{bmatrix} 1 - s_{2k'} \cdot s_{2k'+1} \cdot 2^{-(4k'+1)} & (s_{2k'} + s_{2k'+1} \cdot 2^{-1}) \cdot 2^{-2k'} \\ -(s_{2k'} + s_{2k'+1} \cdot 2^{-1}) \cdot 2^{-2k} & 1 - s_{2k'} \cdot s_{2k'+1} \cdot 2^{-(4k'+1)} \end{bmatrix} \cdot$$

$$\begin{bmatrix} 1 \\ t \end{bmatrix} = \frac{1}{\alpha} \prod_{k'=0}^{\frac{K}{2}} \begin{bmatrix} a_{k'} & b_{k'} \\ -b_{k'} & a_{k'} \end{bmatrix} \cdot \begin{bmatrix} 1 \\ t \end{bmatrix}.$$

Consider that elements corresponding to y are brought to "0" based on a selection of polarities $S_{2k'}$, $S_{2k'+1}$ in course of sequential processing:

$$\begin{cases} x_{k'+1} = \frac{1}{\alpha} \begin{pmatrix} (1 - s_{2k'} \cdot s_{2k'+1} \cdot 2^{-(4k'+1)}) \cdot x_{k'} + \\ (s_{2k'} + s_{2k'+1} \cdot 2^{-1}) \cdot 2^{-2k'} \cdot y_{k'} \end{pmatrix} \\ y_{k'+1} = \frac{1}{\alpha} \begin{pmatrix} -(s_{2k'} + s_{2k'+1} \cdot 2^{-1}) \cdot 2^{-2k} \cdot x_{k'} + \\ (1 - s_{2k'} \cdot s_{2k'+1} \cdot 2^{-(4k'+1)}) \cdot y_{k'} \end{pmatrix} \end{cases} \qquad (90)$$

in each k' of Equation (89).

Since polarities $S_{2k'}$, $S_{2k'+1}$ take each of two values "+1" and "−1," there are four different combinations, and an update of Equation (90) is repeated using the combination closest to "0" from them. Consequently, from a relationship of $$\begin{bmatrix} x \\ y(\Rightarrow 0) \end{bmatrix} = \begin{bmatrix} \cos\theta & \sin\theta \\ -\sin\theta & \cos\theta \end{bmatrix} \cdot \begin{bmatrix} 1 \\ t \end{bmatrix}$$

in Equation (89), $\theta$ is set as a result such that $0 = -\sin\theta + t \cdot \cos\theta$, i.e., $$\frac{\sin\theta}{\cos\theta} = t.$$

This $\theta$ is a total sum of individual rotating angles in the sequential processing, as is apparent from the foregoing description, and can be found with polarities $S_{2k'}$, $S_{2k'+1}$ as:

$$\theta = \sum_{k'=0}^{\frac{K}{2}} (s_{2k'} \cdot \theta_{2k'} + s_{2k'+1} \cdot \theta_{2k'+1}) \tag{91}$$

$$= \sum_{k'=0}^{\frac{K}{2}} \left(s_{2k'} \cdot \tan^{-1} 2^{-2k'} + s_{2k'+1} \cdot \tan^{-1} 2^{-2k'+1}\right).$$

When one wishes to find $\theta = \tan^{-1} t$ which is arctangent of t, t is used as an initial value of Equation (89), and the sequential processing according to Equation (90) is continuously executed with polarities $S_{2k'}$, $S_{2k'+1}$ selected such that y becomes "0," thereby eventually finding desired $\theta$ in accordance with Equation (91). Since this exemplary embodiment also involves matrix operation with elements which are linear sums of 2's negative powers, it can be implemented only by a replacement unit (switch) of wires on a circuit and an adder, without the need for a multiplier, the circuit scale of which is generally large. Also, since the sequential processing which should be performed K times is performed K/2 times, the speed can be increased with low complexity. The foregoing will be described in connection with two exemplary embodiments.

[I] Method of Finding Polarities in Accordance with Equation (87) after Finding $2\theta$ in accordance with Equation (88) and Shifting by One Bit to Produce $\theta$:

Since what is derived by the foregoing method in accordance with Equation (88) is $2\theta$ when $$t = \left(\frac{2|\Omega_{pq}|}{\Omega_{pp} - \Omega_{qq}}\right),$$

polarities $S_{2k'}$, $S_{2k'+1}$ are obtained by quantization with arctangent in accordance with Equation (87) after shifting $2\theta$ by one bit to produce $\theta$.

[II] Method of Directly Finding Quantized Polarities of Arctangent of $\theta$ for Each Group, and Simultaneously Employing the Same in Jacobean Rotation without Stagnation:

From Equation (88), $$\tan 2\theta = \frac{2|\Omega_{pq}|}{\Omega_{pp} - \Omega_{qq}}.$$

On the other hand, $$\tan 2\theta = \frac{\sin 2\theta}{\cos 2\theta} \tag{92}$$

$$= \frac{2\sin\theta\cos\theta}{\cos^2\theta - \sin^2\theta}$$

$$= \frac{2\tan\theta}{1 - \tan^2\theta} \therefore \tan\theta$$

$$= \frac{-1 \pm \sqrt{1 - \tan^2 2\theta}}{\tan 2\theta}.$$

Therefore, $$\tan\theta = \frac{\Omega_{pp} - \Omega_{qq}}{2|\Omega_{pq}|}\left(-1 \pm \frac{\sqrt{(\Omega_{pp} - \Omega_{qq})^2 - 4|\Omega_{pq}|^2}}{\Omega_{pp} - \Omega_{qq}}\right) = \tag{93}$$

$$\frac{\Omega_{qq} - \Omega_{pp} \pm \sqrt{(\Omega_{pp} - \Omega_{qq})^2 - 4|\Omega_{pq}|^2}}{2|\Omega_{pq}|}.$$

(Here, the Sign "±" Before the Radical Sign is Determined by a Range (Quadrant) in which $\theta$ exists.)

When the results of the above equations are used as t, and the sequential processing is performed in accordance with Equation (90), polarities $S_{2k'}$, $S_{2k'+1}$ which are its intermediate result can be used as they are for polarities $S_{2k'}$, $S_{2k'+1}$ of a rotation matrix which is sequentially calculated in the manner of $$\begin{bmatrix} \Omega'_p \\ \Omega'_q \end{bmatrix} =$$

$$\frac{1}{\alpha} \cdot \prod_{k'=0}^{\frac{K}{2}} \begin{bmatrix} 1 - s_{2k'} \cdot s_{2k'+1} \cdot 2^{-(4k'+1)} & (s_{2k'} + s_{2k'+1} \cdot 2^{-1}) \cdot 2^{-2k'} \\ -(s_{2k'} + s_{2k'+1} \cdot 2^{-1}) \cdot 2^{-2k} & 1 - s_{2k'} \cdot s_{2k'+1} \cdot 2^{-(4k'+1)} \end{bmatrix} \cdot \begin{bmatrix} \Omega_p \\ \Omega_q \end{bmatrix}$$

in Equation (83) and Equation (85) without waiting for the final result.

Any of the methods [I], [II] may be used. These approaches can be used in the calculation of unitary matrix $M(-\omega_{pq})$ as well in the following manner.

In the transformation of $\Omega$ with $M(-\Omega_{pq})$ in Equation (52), there is a case in which the unitary matrix is multiplied from the left and another case in which the unitary matrix is multiplied from the right, but they only differ in whether it is acted on row vectors or acted on column vectors in the complex conjugate relationship, so that the description is herein given of the case where it is multiplied from the left. The same is also applied to the processing when it is multiplied from the right. Specifically, in the following equation:

$$M(-\omega_{pq}) \cdot \Omega = \qquad (94)$$

$$\begin{bmatrix} 1 & & & & & \\ & \ddots & & \mathbf{0} & & \\ & & \exp[-j\omega_{pq}] & & & \\ & & & 1 & & \\ & & & & \ddots & \\ & \mathbf{0} & & & & 1 \\ & & & & & & \ddots \end{bmatrix} \cdot \begin{bmatrix} \Omega_{11} & \cdots & * & \cdots & \cdots & * & \cdots & * \\ \vdots & \ddots & \vdots & & & \vdots & & \vdots \\ \Omega_{p1} & \cdots & \Omega_{pp} & \cdots & \cdots & \Omega_{pq} & \cdots & \Omega_{pn} \\ \vdots & & \vdots & \ddots & & \vdots & & \vdots \\ \vdots & & \vdots & & \ddots & \vdots & & \vdots \\ * & \cdots & \Omega_{qp} & \cdots & \cdots & \Omega_{qq} & \cdots & * \\ \vdots & & \vdots & & & \vdots & \ddots & \vdots \\ * & \cdots & * & \cdots & \cdots & * & \cdots & \Omega_{nn} \end{bmatrix} =$$

$$\begin{bmatrix} \Omega_{11} & \cdots & * & \cdots & \cdots & * & \cdots & * \\ \vdots & \ddots & \vdots & & & \vdots & & \vdots \\ \Omega'_{p1} & \cdots & \Omega'_{pp} & \cdots & \cdots & |\Omega_{pq}| & \cdots & \Omega'_{pn} \\ \vdots & & \vdots & \ddots & & \vdots & & \vdots \\ \vdots & & \vdots & & \ddots & \vdots & & \vdots \\ * & \cdots & \Omega_{qp} & \cdots & \cdots & \Omega_{qq} & \cdots & * \\ \vdots & & \vdots & & & \vdots & \ddots & \vdots \\ * & \cdots & * & \cdots & \cdots & * & \cdots & \Omega_{nn} \end{bmatrix}$$

where;

$$\Omega_{pq} = \Omega_{qp}^* \therefore |\Omega_{pq}| = |\Omega_{qp}|,$$

since the p-th row alone undergoes a change, the p-row alone is extracted as a two-dimensional complex vector of a real part and an imaginary part, and represented in the following manner:

$$\begin{bmatrix} X'_p \\ Y'_p \end{bmatrix} = \begin{bmatrix} x'_{p1} & \cdots & x'_{pp} & \cdots & \cdots & x'_{pq} & \cdots & x'_{pn} \\ y'_{p1} & \cdots & y'_{pp} & \cdots & \cdots & 0 & \cdots & y'_{pn} \end{bmatrix} \Leftarrow$$

$$\begin{bmatrix} \cos\omega_{pq} & \sin\omega_{pq} \\ -\sin\omega_{pq} & \cos\omega_{pq} \end{bmatrix} \cdot \begin{bmatrix} x_{p1} & \cdots & x_{pp} & \cdots & \cdots & x_{pq} & \cdots & x_{pn} \\ y_{p1} & \cdots & y_{pp} & \cdots & \cdots & y_{pq} & \cdots & y_{pn} \end{bmatrix}.$$

where;

$$e^{-j\omega_{pq}} = \cos\omega_{pq} - j\sin\omega_{pq},$$

$$\Omega'_{pi} = x'_{pi} + j \cdot y'_{pi},$$

$$\Omega_{pi} = x_{pi} + j \cdot y_{pi}$$

Where, the relationship is the following:

$$\Omega'_{pi} = x'_{pi} + jy'_{pi} = e^{-j\omega_{pq}} \cdot \Omega_{pi} = \begin{pmatrix} \cos(\omega_{pq}) - \\ j\sin(\omega_{pq}) \end{pmatrix} \cdot (x_{pi} + jy_{pi}) = \qquad (95)$$

$$\begin{pmatrix} x_{pi} \cdot \cos(\omega_{pq}) + \\ y_{pi} \cdot \sin(\omega_{pq}) \end{pmatrix} + j \begin{pmatrix} -x_{pi} \cdot \sin(\omega_{pq}) + \\ y_{pi} \cdot \cos(\omega_{pq}) \end{pmatrix} \therefore$$

$$\begin{cases} x'_{pi} = x_{pi} \cdot \cos(\omega_{pq}) + y_{pi} \cdot \sin(\omega_{pq}) \\ y'_{pi} = -x_{pi} \cdot \sin(\omega_{pq}) + y_{pi} \cdot \cos(\omega_{pq}). \end{cases}$$

All elements of the matrix which operates this complex number are real numbers. By employing the same method as above, the following equation is derived:

$$\begin{bmatrix} X'_p \\ Y'_p \end{bmatrix} = \frac{1}{\alpha} \cdot \prod_{k'=0}^{\frac{K}{2}} \begin{bmatrix} 1 - s_{2k'} \cdot s_{2k'+1} \cdot 2^{-(4k'+1)} & (s_{2k'} + s_{2k'+1} \cdot 2^{-1}) \cdot 2^{-2k'} \\ -(s_{2k'} + s_{2k'+1} \cdot 2^{-1}) \cdot 2^{-2k} & 1 - s_{2k'} \cdot s_{2k'+1} \cdot 2^{-(4k'+1)} \end{bmatrix} \qquad (96)$$

$$\cdot \begin{bmatrix} x_{p1} & \cdots & x_{pp} & \cdots & \cdots & x_{pq} & \cdots & x_{pn} \\ y_{p1} & \cdots & y_{pp} & \cdots & \cdots & y_{pq} & \cdots & y_{pn} \end{bmatrix} = \frac{1}{\alpha} \cdot$$

$$\left( \cdots \left( \begin{bmatrix} 1 - s_{2k'} \cdot s_{2k'+1} \cdot 2^{-5} & (s_{2k'} + s_{2k'+1} \cdot 2^{-1}) \cdot 2^{-2} \\ -(s_{2k'} + s_{2k'+1} \cdot 2^{-1}) \cdot 2^{-2} & 1 - s_{2k'} \cdot s_{2k'+1} \cdot 2^{-5} \end{bmatrix} \right. \right.$$

$$\left. \left. \cdot \left( \begin{bmatrix} 1 - s_{2k'} \cdot s_{2k'+1} \cdot 2^{-1} & (s_{2k'} + s_{2k'+1} \cdot 2^{-1}) \\ -(s_{2k'} + s_{2k'+1} \cdot 2^{-1}) & 1 - s_{2k'} \cdot s_{2k'+1} \cdot 2^{-1} \end{bmatrix} \cdots \begin{bmatrix} X_p \\ Y_q \end{bmatrix} \right) \right) \right).$$

A twice higher speed can be accomplished in a manner similar to that described above. Also, it should be understood that a speed four-times higher can be accomplished when every four are collected for grouping. Since even one session of the processing involves matrix operation with elements which are linear sums of 2's negative powers configured based on a plurality of polarities ($S_{2k'}$, $S_{2k'+1}$ in this event), the hardware configuration can be implemented only by a replacement unit (switch unit) of wires on a circuit and an adder, making it possible to increase the speed with low complexity.

When a plurality of pieces are collected for grouping in this way, a plurality of polarities $S_k$ for each group must be collectively supplied. For example, in the example described above, two polarities $S_{2k'}$, $S_{2k'+1}$ must be supplied at one time. In the case of a transformation with unitary matrix $M(-\Omega_{pq})$, because of a phase rotation which cancels out $\Omega_{pq}=|\Omega_{pq}|\exp[j\omega_{pq}]=\Omega_{qp}^*$ of the target, the following equation is derived:

$$\omega_{pq} = \tan^{-1}\left(\frac{y_{pq}}{x_{pq}}\right). \quad (97)$$

In this event, since there is no coefficient of ½ unlike Equation (88), a quantization polarity of arctangent of $\omega_{pq}$ can be directly found on a group-by-group basis, and can be simultaneously supplied to the sequential rotation of Equation (96) without stagnation. Specifically, $$t = \left(\frac{y_{pq}}{x_{pq}}\right) \quad (98)$$

is substituted into Equation (89), and the sequential processing according to Equation (90) is continuously executed with polarities $S_{2k'}$, $S_{2k'+1}$ selected such that y becomes "0." Since polarities $S_{2k'}$, $S_{2k'+1}$ take each of two values "+1" and "−1," there are four different combinations, and an update of Equation (90) is repeated using the combination in which y is closest to "0" from them. Polarities $S_{2k'}$, $S_{2k'+1}$ which are found each time the update is performed are values which are supplied when an update operation is performed based on Equation (96). Therefore, polarities $S_{2k'}$, $S_{2k'+1}$ which are its intermediate result can be used as they are in the sequential processing of $$\begin{bmatrix} X'_p \\ Y'_p \end{bmatrix} = \frac{1}{\alpha} \cdot \prod_{k'=0}^{\frac{K}{2}} \begin{bmatrix} 1 - s_{2k'} \cdot s_{2k'+1} \cdot 2^{-(4k'+1)} & (s_{2k'} + s_{2k'+1} \cdot 2^{-1}) \cdot 2^{-2k'} \\ -(s_{2k'} + s_{2k'+1} \cdot 2^{-1}) \cdot 2^{-2k} & 1 - s_{2k'} \cdot s_{2k'+1} \cdot 2^{-(4k'+1)} \end{bmatrix} \cdot \begin{bmatrix} X_p \\ Y_q \end{bmatrix}$$

without waiting for the completion of the sequential processing in accordance with Equation (90). Since this processing involves matrix operation with elements which are linear sums of 2's negative powers, the hardware configuration can be implemented only by a replacement unit (switch) of wires on a circuit and an adder, making it possible to increase the speed with low complexity.

Figure 6A:
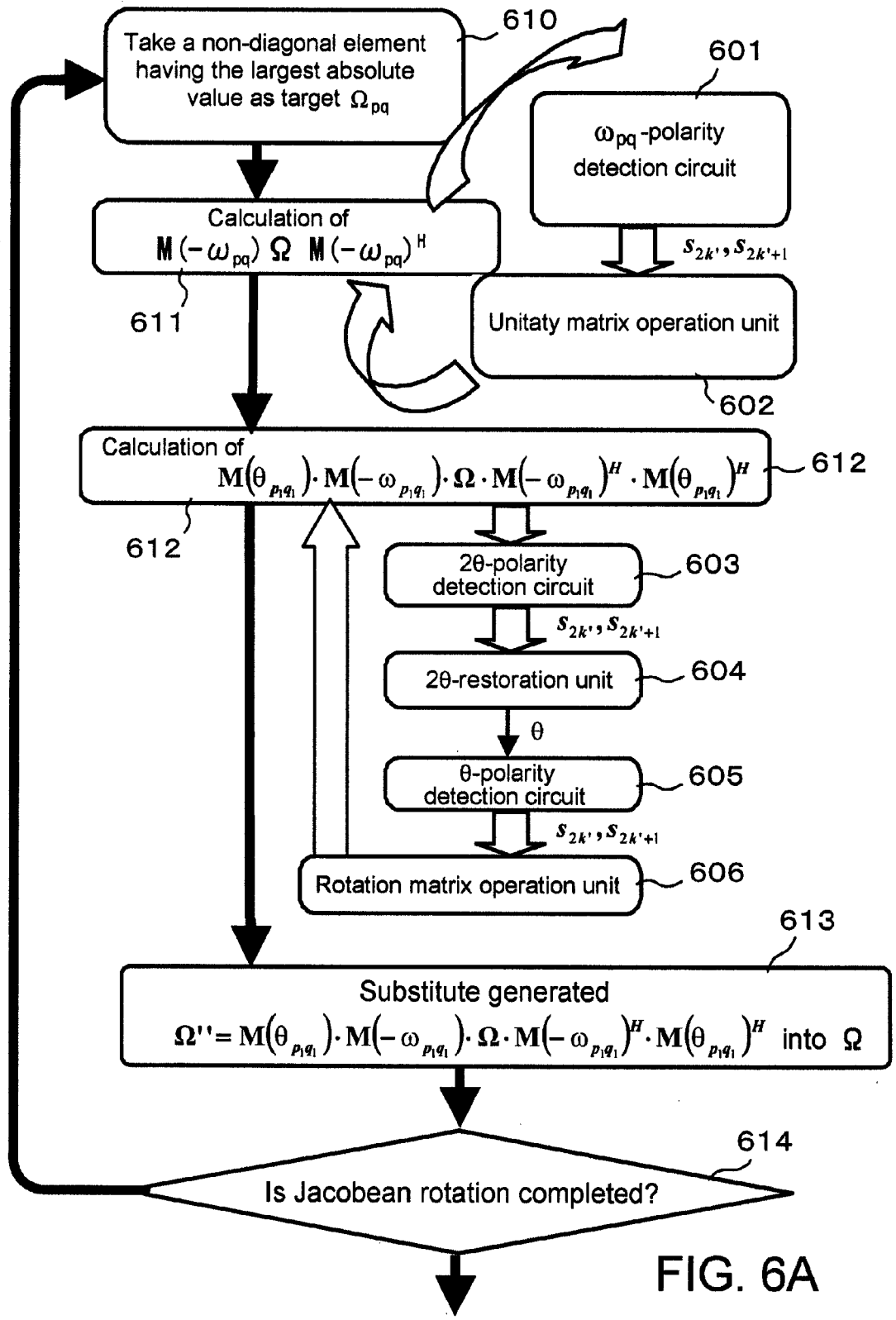
FIG. 6A is a diagram illustrating the configuration of a Jacobean rotation operation unit and describing Jacobean rotation.

FIG. 6A shows the processing of the Jacobean rotation which is configured based on the foregoing relationship. In FIG. 6A, the left side as shown in the figure represents flow processing by a sequencer, and the right side as shown in the figure represents blocks configured in hardware as a Jacobean rotation operation unit for performing Jacobean rotation operation. The Jacobean rotation operation unit comprises $\omega_{pq}$-polarity detection unit 601; unitary matrix operation unit 602 for performing operation of unitary matrix M(−$\omega_{pq}$); 2θ-polarity detection unit 603 for detecting the polarity of 2θ; 2θ-restoration unit 604 for restoring 2θ and calculating θ; θ-polarity detection unit 605 for detecting the polarity of θ; and rotation matrix operation unit 606 for performing operation of rotation matrix M($\theta_{p_1q_1}$). The Jacobean rotation operation unit is provided in eigenvalue/eigenvector calculation unit 103, as will be later described with reference to FIG. 7.

Next, a description will be given of the operation of this Jacobean rotation operation unit.

Since the shown one performs the Jacobean rotation, a non-diagonal element having the largest absolute value is selected from non-diagonal elements of Ω as target $\Omega_{pq}$ (step 610). When a selected element is a complex number, operation with unitary matrix M(−$\omega_{pq}$) is required (step 611). Blocks for this purpose are $\omega_{pq}$-polarity detection unit 601 and unitary matrix operation unit 602. $\omega_{pq}$-polarity detection unit 601 applies Equation (98) to Equation (89) to calculate polarities $S_{2k'}$, $S_{2k'+1}$. FIG. 6B illustrates a calculation process performed by $\omega_{pq}$-polarity detection unit 601. Unitary matrix operation unit 602 performs operation M(−ωpq)·Ω based on polarities $S_{2k'}$, $S_{2k'+1}$ calculated by $\omega_{pq}$-polarity detection unit 601, further calculates a row vector of change symmetry, and further calculates a column vector of change symmetry through matrix operation from the left. FIG. 6C illustrates a calculation process performed by unitary matrix operation unit 602. Since these processes are similar processes, a row vector alone is described.

This exemplary embodiment is assumed to perform matrix processing with elements which are linear sums of 2's negative powers without using a multiplier, and is configured to execute the matrix operation only using a replacement unit (switch) of wires on a circuit and an adder, but may perform complex conjugate operation directly using a matrix multiplier.

Figure 6G:
FIG. 6G is a diagram for describing a rotation matrix operation unit in the Jacobean rotation operation unit.

After a matrix including target elements in this way has transformed into M(−$\omega_{p_1q_1}$)·Ω·M(−$\omega_{p_1q_1}$)$^H$ by real number conversion processing at step 611, operation of M($\theta_{p_1q_1}$)·M(−$\omega_{p_1q_1}$)·Ω·M(−$\omega_{p_1q_1}$)$^H$·M($\theta_{p_1q_1}$)$^H$ at step 612 follows. Blocks which perform the operation are 2θ-polarity detection unit 603, 2θ-restoration unit 604, θ-polarity detection unit 605, and rotation matrix operation unit 606. 2θ-polarity detection unit 603 has a function of detecting a rotation angle which brings target element $\Omega_{pq}$ to "0." FIG. 6D illustrates a calculation process performed by 2θ-polarity detection unit 603. This exemplary embodiment employs a method in which 2θ is found in accordance with Equation (88) based on the aforementioned [I] (2θ-restoration unit 604), and shifted by one bit for conversion to θ, and the polarity is found in accordance with Equation (87). Specifically, with $$t = \left(\frac{2|\Omega_{pq}|}{\Omega_{pp} - \Omega_{qq}}\right),$$

the sequential processing $$\begin{cases} x_{k'+1} = \frac{1}{\alpha}\left( \begin{array}{l}(1 - s_{2k'} \cdot s_{2k'+1} \cdot 2^{-(4k'+1)}) \cdot x_{k'} + \\ (s_{2k'} + s_{2k'+1} \cdot 2^{-1}) \cdot 2^{-2k'} \cdot y_{k'} \end{array}\right) \\ y_{k'+1} = \frac{1}{\alpha}\left( \begin{array}{l} -(s_{2k'} + s_{2k'+1} \cdot 2^{-1}) \cdot 2^{-2k'} \cdot x_{k'} + \\ (1 - s_{2k'} \cdot s_{2k'+1} \cdot 2^{-(4k'+1)}) \cdot y_{k'} \end{array}\right) \end{cases}$$

of Equation (89) is performed. Based on a selection of polarities $S_{2k'}$, $S_{2k'+1}$, y in the above equations is processed to approach to "0". Since polarities $S_{2k'}$, $S_{2k'+1}$ take each of two values of "+1" and "−1," there are four different combinations from which the combination closest to "0" is used to repeat updates. 2θ-restoration unit 604 restores 2θ in accordance with Equation (91) based on polarities $S_{2k'}$, $S_{2k'+1}$ which are the outputs, and 2θ is shifted by one bit to output θ by a wire replacement (wire switch). FIG. 6E illustrates a calculation process performed by 2θ-restoration unit 604. θ-polarity detection unit 605 quantizes this θ with arctangent through an update by sequential comparison of every four values in accordance with Equation (87) to generate polarities $S_{2k'}$, $S_{2k'+1}$. FIG. 6F illustrates a calculation process performed by θ-polarity detection unit 605. Rotation matrix operation unit 606 executes the sequential processing through the sequential processing in accordance with Equation (83) based on polarities $S_{2k'}$, $S_{2k'+1}$ applied thereto without waiting for final results, calculates the p-th column and q-th column taking the p-th row and q-th row or complex conjugates thereof, and also calculates remaining four diagonal elements in accordance with Equation (85). FIG. 6G illustrates a calculation process performed by rotation matrix operation unit 606.

The operation of $M(\theta_{p_1q_1}) \cdot M(-\omega_{p_1q_1}) \cdot \Omega \cdot M(-\omega_{p_1q_1})^H \cdot M(\theta_{p_1q_1})^H$ at step 612 is completed in this way. This result is substituted into Ω which is a Hermitian matrix, and similar processing is continued, or is compared with a completion condition for the Jacobean rotation previously determined at step 613, and similar processing is repeated if necessary. In this way, the Jacobean rotation is executed.

Figure 7:
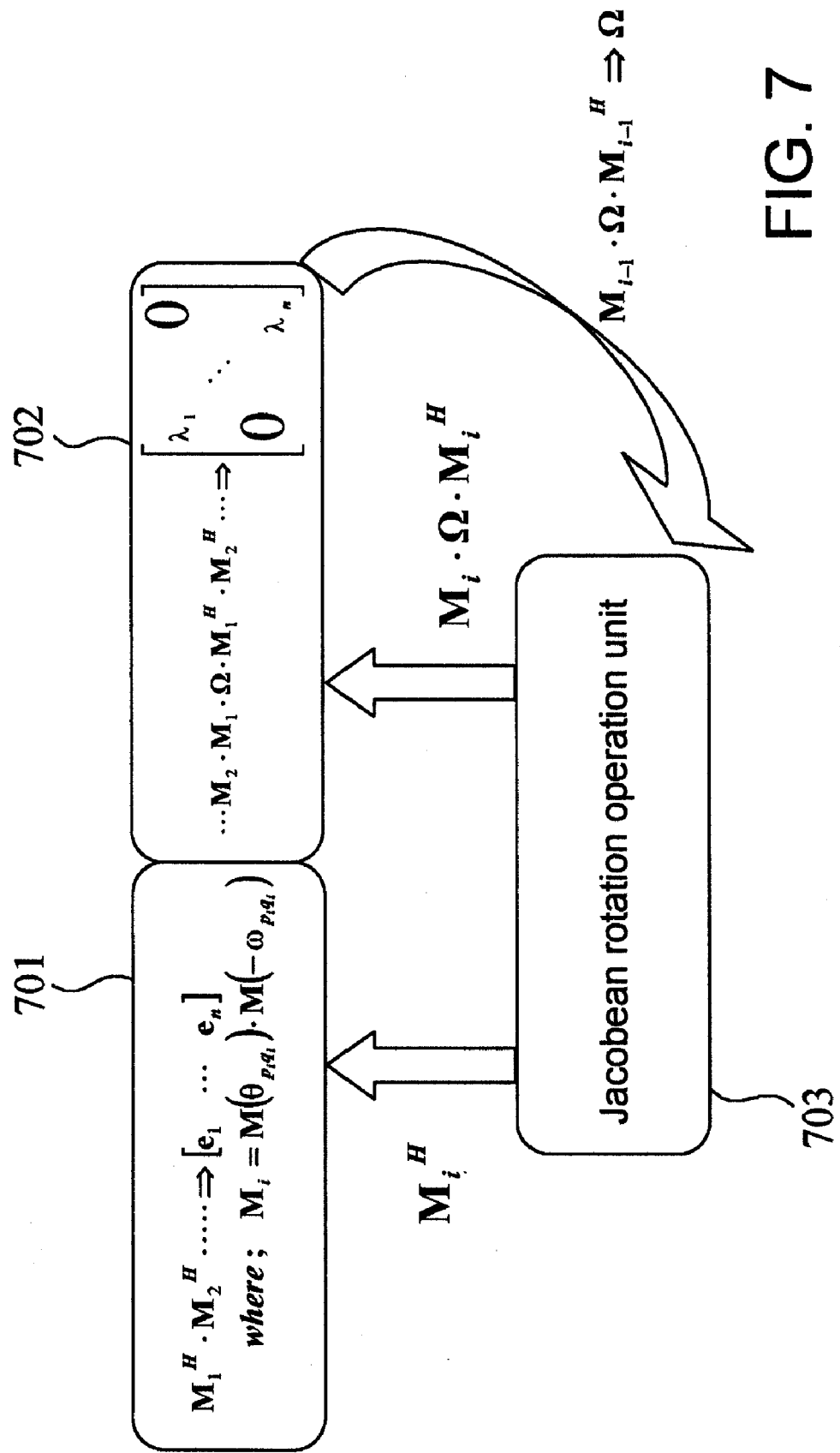
FIG. 7 is a diagram illustrating the configuration of an eigenvalue/eigenvector calculation unit and describing operation of eigenvalues and eigenvector through Jacobean rotation.

FIG. 7 illustrates the internal configuration of eigenvalue/eigenvector calculation unit 103, showing a operation process of the eigenvector which is calculated simultaneously with the Jacobean rotation. Eigenvalue/eigenvector calculation unit 103 includes eigenvector calculation unit 701, eigenvalue calculation unit 702, and Jacobean rotation operation unit 703 which has been previously described in connection with FIG. 6A.

In FIG. 7, an arrow which connects eigenvalue calculation unit 702 to Jacobean rotation operation unit 703 represents the behavior of the Jacobean rotation described above. Ω is updated by eigenvalue calculation unit 702, $M_{i-1} \cdot \Omega \cdot M_{i-1}H$ is newly substituted into Ω, and this Ω is sent to Jacobean rotation unit 703. Jacobean rotation unit 703 performs processing of $M_i \cdot \Omega \cdot M_i^H$ for Ω sent thereto, and sends it back again to eigenvalue calculation unit 702. Through this sequence of sequential processing, values of $M_2 \cdot M_1 \cdot \Omega \cdot M_1^H \cdot M_2^H \ldots$ are accumulated in eigenvalue calculation unit 702, and from the relationship of $$\ldots M_2 \cdot M_1 \cdot \Omega \cdot M_1^H \cdot M_2^H \ldots \Rightarrow \begin{bmatrix} \lambda_1 & & 0 \\ & \ddots & \\ 0 & & \lambda_n \end{bmatrix}$$

in accordance with Equation (69), eigenvalue calculation unit 702 can derive eigenvalues $\lambda_1, \ldots, \lambda_n$. In parallel with this processing, eigenvector calculation unit 701 is applied with a rotation matrix $M_i^H = M(-\omega_{p_iq_i})^H \cdot M(\theta_{p_iq_i})^H$ from Jacobean rotation operation unit 703, and values of $M_1^H \cdot M_2^H \ldots$ are accumulated with unitary matrix I as an initial value. As a result, from the relationships of Equations (74), (75), $$M_1^H \cdot M_2^H \ldots \Rightarrow [m_1 \ldots m_n] \text{ or } [e_1 \ldots e_n],$$

eigenvector calculation unit 701 can derive eigenvectors $e_1, \ldots, e_n$.

Figure 8:
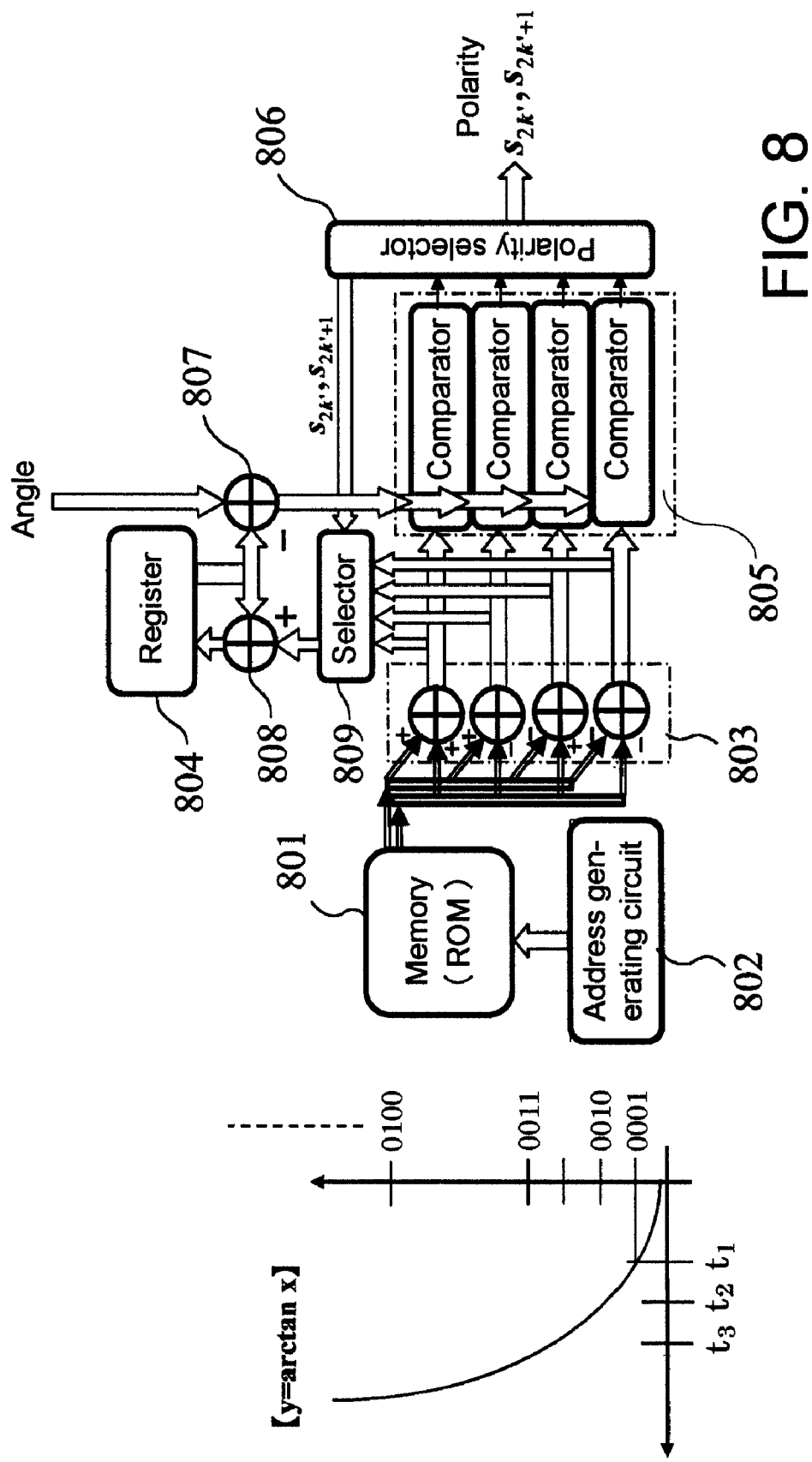
FIG. 8 is a block diagram illustrating the configuration of an arctangent quantization circuit (ASC; Angle-to-Sine Converter)

FIG. 8 illustrates an arctangent quantization circuit which is an example of an exemplary embodiment of θ-polarity detection unit 605 illustrated in FIG. 6F. The arctangent quantization circuit includes read-only memory 801, address generating circuit 802 for generating an address for memory 801, four signed adders 803 provided on the output side of memory 801, register 804 for temporarily storing data, comparator 805 provided for each signed adder 803, polarity selector 806, subtractor 807, adder 808, and selector 809 for selecting one of outputs of four signed adders 803. This arctangent quantization circuit is a circuit which quantizes for input Angle θ with arctangent through sequential comparisons of every four values based on Equation (87) to generate polarities $S_{2k'}$, $S_{2k'+1}$.

Here, since it is assumed that every two are grouped, memory 801 stores arctangent $\tan^{-1} 2^{-2k'}$, $S_{2k'+1} \cdot \tan^{-1} 2^{-2k'-1}$ (k'=1 to K/2) for two 2's negative powers different from each other. Address generating circuit 802 generates an address from 1 to K/2, where the generated address is comparable to k' because the output of address generating circuit 802 is connected to an address input of memory 801. The $\tan^{-1} 2^{-2k'}$, $S_{2k'+1} \cdot \tan^{-1} 2^{-2k'-1}$ thus generated are added in the following four combinations by signed adders 803, and are applied to comparators 805, respectively, as signed sums. The four values are:

$$\left( s_{2k'} \cdot \tan^{-1} 2^{-2k'} + s_{2k'+1} \cdot \tan^{-1} 2^{-2k'+1} \right) \quad (99)$$

where $$s_{2k'}, s_{2k'+1} = \begin{cases} +1, & +1 \\ +1, & -1 \\ -1, & +1 \\ -1, & -1. \end{cases}$$

While θ is applied to the other input of each comparator 805, in this event, a value derived by subtracting a signed sum selected the last time and stored in register 804, i.e., $$\theta - \sum_{k'=0}^{k'-1} \left( s_{2k'} \cdot \tan^{-1} 2^{-2k'} + s_{2k'+1} \cdot \tan^{-1} 2^{-2k'+1} \right)$$

is supplied. Therefore, outputs of four comparators 805 change values anywhere in the four outputs. Polarity selector 806 performs processing of selecting current polarities $S_{2k'}$, $S_{2k'+1}$ on a boundary on which the value changes, and this is the output of the arctangent quantization circuit. The output at this time is applied to selector 809 as well, and as a result, values corresponding to these $S_{2k'}$, $S_{2k'+1}$ are selected based on Equation (99). Then, for the next processing of the sequential processing, the accumulated results of the signed sums for the next time are stored in register 804 by an accumulator made up of adder 808 and register 804.

Figure 9:
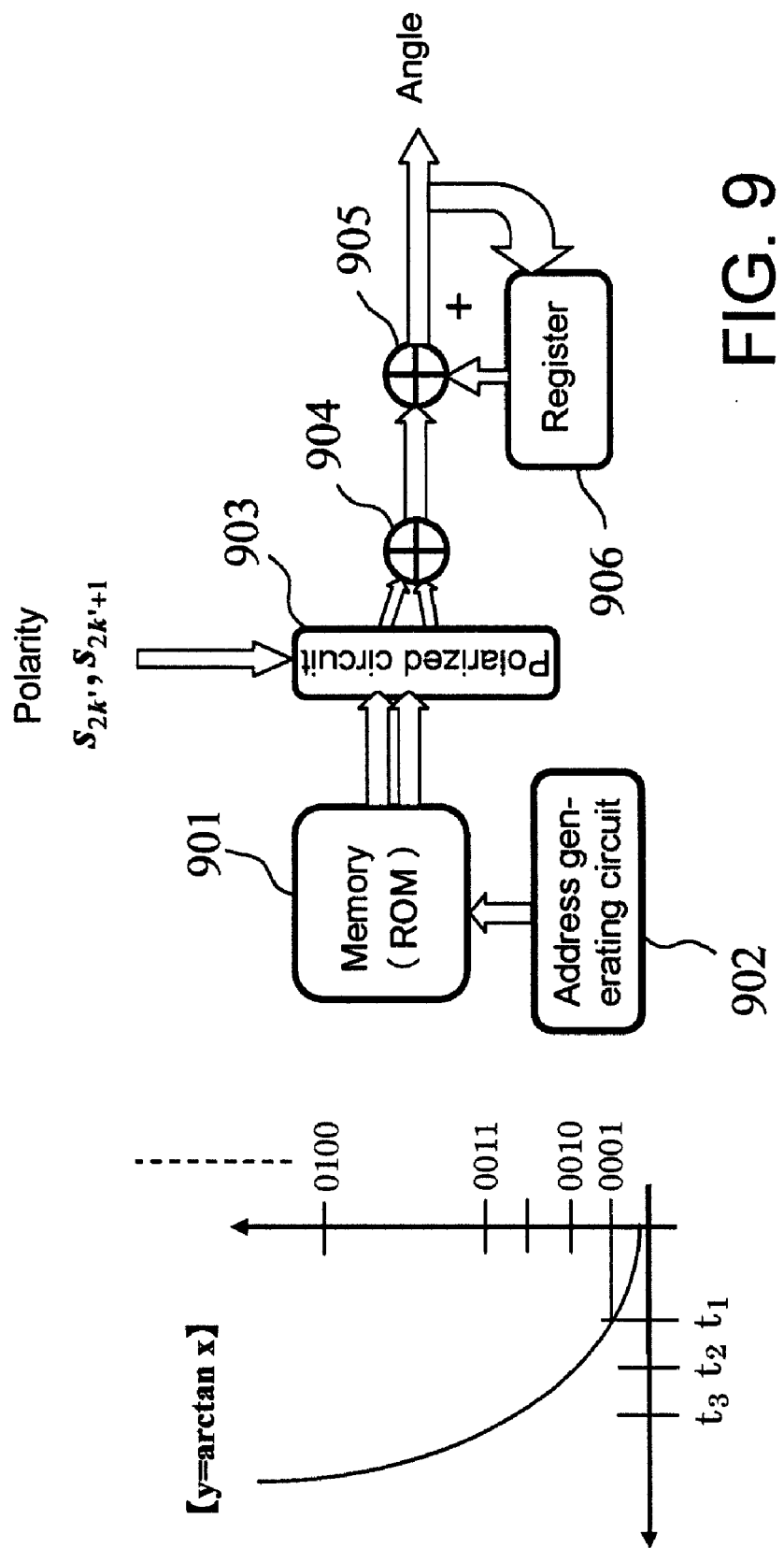
FIG. 9 is a block diagram illustrating the configuration of an angle restoration circuit (SAC; sign-to-angle).

FIG. 9 illustrates an angle restoration circuit which is an example of an exemplary embodiment of 2θ-restoration unit 604 illustrated in FIG. 6E. The angle restoration circuit is a circuit which recovers 2θ in accordance with Equation (91), for example, in the case of FIG. 6E, for polarities $S_{2k'}$, $S_{2k'+1}$ applied thereto. The angle restoration unit includes read-only memory 901, address generating circuit 902 for generating an address for memory 901, polarizing circuit 903 provided on the output side of memory 901, adder 904 for adding two outputs of polarizing circuit 903, register 906 for temporarily storing data, and adder 905 for adding the output of adder 904 and the output of register 906.

Like the case of FIG. 8, memory 901 stores art tangent $\tan^{-1} 2^{-2k'}$, $S_{2k'+1} \cdot \tan^{-1} 2^{-2k'-1}$ (k'=1 to K/2) for two 2's negative powers different from each other. Address generating circuit 902 generates an address in conformity to polarities $S_{2k'}$, $S_{2k'+1}$ applied thereto, whereby the output of memory 901 which is formed into a signed sum by polarizing circuit 903 and adder 904 is represented by $(S_{2k'} \cdot \tan^{-1} 2^{-2k'} + S_{2k'+1} \cdot \tan^{-1} 2^{-2k'-1})$. Here, $S_{2k'}$, $S_{2k'+1}$ are polarities applied to polarizing circuit 903. Since accumulated results of previous signed sums exist in an accumulator made up of adder 905 and register 906, Angle which is the output when processing up to K/2 is completed is represented by $$\sum_{k'=0}^{\frac{K}{2}} \left( s_{2k'} \cdot \tan^{-1} 2^{-2k'} + s_{2k'+1} \cdot \tan^{-1} 2^{-2k'+1} \right).$$

In other words, the processing by these circuits can be regarded to simplify triangular function operation such as the Jacobean rotation and the like by converting an angle in a region configured by arctangent for 2's negative power using an arctangent quantization circuit which is an angular polarity converter circuit. An inverse conversion of the angle polarization conversion is a polarization angle conversion which can be implemented by the angle restoration circuit.

The processing described above, including those illustrated in FIGS. 6A and 7 for describing the Jacobean rotation, is matrix operation with elements which are linear sums of 2's negative powers, and can be implemented only by a replacement unit (switch) of wires on a circuit and an adder, making it possible to increase the speed with low complexity. Also, while arctangent for 2's negative power is used in the angle polarity conversion or inverse conversion thereof, this can be implemented using a memory or a look-up table, and the addresses are required only to a depth corresponding to a bit width, and can be implemented with a small amount of memory.

The invention claimed is:

1. A MIMO decoder comprising:
generalized inverse matrix calculating means for calculating a generalized inverse matrix of Moore-Penrose derived from a channel matrix indicative of a radiowave propagation environment or a virtual channel matrix based on a virtual propagation path; and
searching means for searching a transmission signal vector centered at a generalized inverse matrix solution calculated by said generalized inverse matrix calculating means,
wherein a search area of the transmission signal vector is variable in response to a change in the channel matrix or the virtual channel matrix, and
said searching means performs weighting for each eigen vector calculated from the channel matrix or the virtual channel matrix in inverse proportion to a square root of an eigen value corresponding to the eigen vector, and determines the search area of the transmission signal vector based on the weighted result.

2. The MIMO decoder according to claim 1, comprising eigen value/eigen vector calculating means for calculating an eigen value and an eigen vector corresponding to the eigen value based on the channel matrix or the virtual channel matrix.

3. The MIMO decoder according to claim 2, wherein said searching means performs the weighting in inverse proportion to the square root of a minimum eigen value, among the calculated eigen values, for an eigen vector corresponding to the minimum eigen value, and performs the weighting for each eigen vector corresponding to an eigen value except for the minimum eigen value in inverse proportion to the square root of each eigen value corresponding to each said eigen vector for a scalar amount corresponding to each said eigen vector.

4. The MIMO decoder according to claim 3, wherein said searching means selects an eigen vector corresponding to the minimum eigen value and gives a width of the search area for each element in the selected eigen vector in a form inversely proportional to the square root of each eigen value except for the minimum eigen value while maintaining each element relationship within the selected eigen vector.

5. The MIMO decoder according to claim 2, wherein
said eigen value/eigen vector calculating means comprises factorizing means for calculating the eigen value and eigen vector using Jacobean rotation, and sequentially factorizing a rotating angle in the Jacobean rotation for each group as a signed sum of a plurality of arctangents for 2's negative power, and
a rotation matrix is used for the Jacobean rotation, said rotation matrix having elements which are linear sums of 2's negative powers configured based on a plurality of polarities for each of the groups formed by said factorizing means.

6. The MIMO decoder according to claim 5, wherein:
said factorizing means comprises:
a memory having arctangents for a plurality of 2's negative powers different from one another as values for each group;
means for generating an address indicative of a group of said memory; and
means for comparing an accumulation result of a signed sum of a plurality of arctangent data read from said memory and the signed sums up to the preceding time with a Jacobean rotation angle,
wherein a result of the comparison is designated as a polarity of a current in-group arctangent.

7. The MIMO decoder according to claim 1, wherein said virtual channel matrix includes a contribution based on incompleteness of a transceiver.

8. A MIMO decoder comprising:
minimum mean square error norm calculating means for executing processing based on a minimum mean square norm from a channel matrix indicative of a radiowave propagation environment or a virtual channel matrix based on a virtual propagation path; and
searching means for searching a transmission signal vector centered at a detection result calculated by said minimum mean square error norm calculating means,
wherein a search area of the transmission signal vector is variable in response to a change in the channel matrix or the virtual channel matrix, and
said searching means performs weighting for each eigen vector calculated from the channel matrix or the virtual channel matrix in inverse proportion to a square root of an eigen value corresponding to the eigen vector, and determines the search area of the transmission signal vector based on the weighted result.

9. The MIMO decoder according to claim 8, comprising eigen value/eigen vector calculating means for calculating an eigen value and an eigen vector corresponding to the eigen value based on the channel matrix or the virtual channel matrix.

10. The MIMO decoder according to claim 9, wherein said searching means performs the weighting in inverse proportion to the square root of a minimum eigen value, among the calculated eigen values, for an eigen vector corresponding to the minimum eigen value, and performs the weighting for each eigen vector corresponding to an eigen value except for the minimum eigen value in inverse proportion to the square root of each eigen value corresponding to each said eigen vector for a scalar amount corresponding to each said eigen vector.

11. The MIMO decoder according to claim 10, wherein said searching means selects an eigen vector corresponding to the minimum eigen value and gives a width of the search area for each element in the selected eigen vector in a form inversely proportional to the square root of each eigen value except for the minimum eigen value while maintaining each element relationship within the selected eigen vector.

12. The MIMO decoder according to claim 9, wherein
said eigen value/eigen vector calculating means comprises
factorizing means for calculating the eigen value and eigen vector using Jacobean rotation, and sequentially factorizing a rotating angle in the Jacobean rotation for each group as a signed sum of a plurality of arctangents for 2's negative power, and
a rotation matrix is used for the Jacobean rotation, said rotation matrix having elements which are linear sums of 2's negative powers configured based on a plurality of polarities for each of the groups formed by said factorizing means.

13. The MIMO decoder according to claim 12, wherein:
said factorizing means comprises:
a memory having arctangents for a plurality of 2's negative powers different from one another as values for each group;
means for generating an address indicative of a group of said memory; and
means for comparing an accumulation result of a signed sum of a plurality of arctangent data read from said memory and the signed sums up to the preceding time with a Jacobean rotation angle,
wherein a result of the comparison is designated as a polarity of a current in-group arctangent.

14. The MIMO decoder according to claim 8, wherein said virtual channel matrix includes a contribution based on incompleteness of a transceiver.

15. A MIMO decoding method comprising:
a step of receiving a transmission signal to acquire a transmission signal vector;
a step of calculating a generalized inverse matrix of Moore-Penrose derived from a channel matrix indicative of a radiowave propagation environment or a virtual channel matrix indicative of a virtual propagation path;
a step of calculating an eigen value and an eigen vector based on the channel matrix or the virtual channel matrix; and
a search step of searching the transmission signal vector centered at a generalized inverse matrix solution of Moore-Penrose,
wherein a search area of the transmission signal vector is variable in response to a change in the channel matrix or the virtual channel matrix, and
in said search step, weighting is performed for each eigen vector calculated from the channel matrix or the virtual channel matrix in inverse proportion to a square root of an eigen value corresponding to the eigen vector, and the search area of the transmission signal vector is determined based on the weighted result.

16. The MIMO decoding method according to claim 15, wherein
in said search step, the weighting is performed in inverse proportion to the square root of a minimum eigen value, among the calculated eigen values, for an eigen vector corresponding to the minimum eigen value, and the weighting is performed for each eigen vector corresponding to an eigen value except for the minimum eigen value in inverse proportion to the square root of each eigen value corresponding to each said eigen vector for a scalar amount corresponding to each said eigen vector.

17. The MIMO decoding method according to claim 16, wherein in said search step, an eigen vector corresponding to the minimum eigen value is selected and a width of the search area is given for each element in the selected eigen vector in a form inversely proportional to the square root of each eigen value except for the minimum eigen value while maintaining each element relationship within the selected eigen value.

18. The MIMO decoding method according to claim 15, wherein said virtual channel matrix includes a contribution based on incompleteness of a transceiver.

19. A MIMO decoding method comprising:
a step of receiving a transmission signal to acquire a transmission signal vector;
executing processing based on a minimum mean square error norm from a channel matrix indicative of a radiowave propagation environment or a virtual channel matrix indicative of a virtual propagation path;
a step of calculating an eigen value and an eigen vector based on the channel matrix or the virtual channel matrix; and
a search step of searching the transmission signal vector centered at a detection result by the processing based on the minimum mean square error norm,
wherein a search area of the transmission signal vector is variable in response to a change in the channel matrix or the virtual channel matrix, and
in said search step, weighting is performed for each eigen vector calculated from the channel matrix or the virtual channel matrix in inverse proportion to a square root of an eigen value corresponding to the eigen vector, and the search area of the transmission signal vector is determined based on the weighted result.

20. The MIMO decoding method according to claim 19, wherein
in said search step, the weighting is performed in inverse proportion to the square root of a minimum eigen value, among the calculated eigen values, for an eigen vector corresponding to the minimum eigen value, and the weighting is performed for each eigen vector corresponding to an eigen value except for the minimum eigen value in inverse proportion to the square root of each eigen value corresponding to each said eigen vector for a scalar amount corresponding to each said eigen vector.

21. The MIMO decoding method according to claim 20, wherein in said search step, an eigen vector corresponding to the minimum eigen value is selected and a width of the search area is given for each element in the selected eigen vector in a form inversely proportional to the square root of each eigen value except for the minimum eigen value while maintaining each element relationship within the selected eigen value.

22. The MIMO decoding method according to claim 19, wherein said virtual channel matrix includes a contribution based on incompleteness of a transceiver.

* * * * *

UNITED STATES PATENT AND TRADEMARK OFFICE
CERTIFICATE OF CORRECTION

PATENT NO. : 7,830,988 B2
APPLICATION NO. : 11/909867
DATED : November 9, 2010
INVENTOR(S) : Tsuguo Maru It is certified that error appears in the above-identified patent and that said Letters Patent is hereby corrected as shown below:

Column 10, Line 20: Delete "$\{s^H-y^H \cdot (H^H \cdot H)^{-1}\}$" and insert -- $\{s^H-y^H \cdot (H^H \cdot H)^{-1}\}$ --

Column 14, Line 12: Delete "$Q=H^H \cdot H;$" and insert -- $\Omega=H^H \cdot H;$ --

Column 18, Line 36: Delete " [formula] " and insert -- [formula] --

Column 20, Line 24: Delete "$\{\alpha;|\alpha|\leq|e^{j\theta\alpha}|\},$" and insert -- $\{a;|a|\leq|e^{j\theta a}|\},$ --

Column 21, Line 40: Delete "$\alpha=e^{j\theta\alpha},$" and insert -- $a=e^{j\theta a},$ --

Column 22, Line 46: Delete "$Q=H^H \cdot H$" and insert -- $\Omega=H^H \cdot H$ --

Column 23, Line 17: Delete " [matrix M] " and insert -- [matrix M] --

Column 25, Line 45: Delete "$-\Omega_{iq}\sin\theta$" and insert -- $-\Omega_{ip}\sin\theta$ --

Signed and Sealed this
Third Day of May, 2011

David J. Kappos
*Director of the United States Patent and Trademark Office*